United States Patent
Germain et al.

(10) Patent No.: US 7,049,911 B2
(45) Date of Patent: May 23, 2006

(54) CIRCUIT INTERRUPTING DEVICE AND SYSTEM UTILIZING ELECTROMECHANICAL RESET

(75) Inventors: Frantz Germain, Rosedale, NY (US); James Richter, Bayside, NY (US); David Herzfeld, Huntingtin, NY (US); Armando Calixto, Floral Park, NY (US); David Chan, Bellerose, NY (US); Stephen Stewart, Berrien Springs, MI (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 0 days.

(21) Appl. No.: 10/692,056

(22) Filed: Oct. 22, 2003

(65) Prior Publication Data

US 2004/0218316 A1    Nov. 4, 2004

Related U.S. Application Data

(60) Provisional application No. 60/444,469, filed on Feb. 3, 2003.

(51) Int. Cl.
*H01H 73/00* (2006.01)

(52) U.S. Cl. .......................... 335/18; 361/42
(58) Field of Classification Search .............. 335/18; 361/42–51
See application file for complete search history.

(56) References Cited

U.S. PATENT DOCUMENTS

| | | | |
|---|---|---|---|
| 4,034,266 A | 7/1977 | Virani et al. | |
| 4,442,470 A | 4/1984 | Misencik | |
| 4,595,894 A | 6/1986 | Doyle et al. | |
| 4,630,015 A | 12/1986 | Gernhardt et al. | |
| 4,719,437 A | 1/1988 | Yun | |
| 4,802,052 A | 1/1989 | Brant et al. | |
| 4,851,951 A | 7/1989 | Foster, Jr. | |
| 4,979,070 A | 12/1990 | Bodkin | |
| 5,185,687 A | 2/1993 | Beihoff et al. | |
| 5,223,810 A | 6/1993 | Van Haaren | |
| 5,224,006 A | 6/1993 | MacKenzie et al. | |
| 5,363,269 A | 11/1994 | McDanold | |
| 5,477,412 A | 12/1995 | Neiger et al. | |
| 5,510,760 A | 4/1996 | Marcou et al. | |
| 5,541,800 A | 7/1996 | Misencik | |
| 5,594,398 A | 1/1997 | Marcou et al. | |
| 5,600,524 A | 2/1997 | Neiger et al. | |
| 5,694,280 A * | 12/1997 | Zhou .......................... 361/45 |
| 5,706,155 A | 1/1998 | Neiger et al. | |
| 5,729,417 A | 3/1998 | Neiger et al. | |
| 5,805,397 A | 9/1998 | MacKenzie | |
| 5,933,063 A * | 8/1999 | Keung et al. .................. 335/18 |
| 6,040,967 A | 3/2000 | DiSalvo | |

(Continued)

FOREIGN PATENT DOCUMENTS

WO    WO 2004/070751 A3    8/2004

(Continued)

*Primary Examiner*—Lincoln Donovan
(74) *Attorney, Agent, or Firm*—Paul J. Sutton

(57) ABSTRACT

A GFCI device which has reverse wiring protection is provided where no power is present at the face terminals even when the device is reverse wired. The device has a pair of movable bridges connected to its terminals. The terminal bridge pair makes contact with the load and face terminals providing power to these terminals when the device is reset. The device also has a reset lockout feature that prevents it from being reset after having been tripped if the circuit interrupting portion of the device is non-operational.

5 Claims, 18 Drawing Sheets

U.S. PATENT DOCUMENTS

| | | |
|---|---|---|
| 6,052,265 A | 4/2000 | Zaretsky et al. |
| 6,226,161 B1 | 5/2001 | Neiger et al. |
| 6,246,558 B1 | 6/2001 | DiSalvo et al. |
| 6,252,407 B1 | 6/2001 | Gershen |
| 6,437,953 B1 | 8/2002 | DiSalvo et al. |
| 6,590,753 B1 | 7/2003 | Finlay |
| 6,864,766 B1 | 3/2005 | DiSalvo et al. |

FOREIGN PATENT DOCUMENTS

| | | |
|---|---|---|
| WO | WO 2004/070752 A2 | 8/2004 |

\* cited by examiner

CIRCUIT INTERRUPTING DEVICE AND SYSTEM UTILIZING ELECTROMECHANICAL RESET

This application claims the benefit of the filing date of a provisional application having Ser. No. 60/444,469 which was filed on Feb. 3, 2003.

This application is being filed on Oct. 22, 2003 concurrently with a commonly owned and related application entitled "Circuit Interrupting Device and System Utilizing Bridge Contact Mechanism and Reset Lockout."

BACKGROUND

1. Field

The present application is directed to a family of resettable circuit interrupting devices and systems that comprises ground fault circuit interrupters (GFCI's), arc fault circuit interrupters (AFCI's), immersion detection circuit interrupters (IDCI's), appliance leakage circuit interrupters (ALCI's), equipment leakage circuit interrupters (ELCI's), circuit breakers, contactors, latching relays and solenoid mechanisms. More particularly, the present application is directed to circuit interrupting devices that include a circuit interrupting portion that can break electrically conductive paths between a line side and a load side of the devices.

2. Description of the Related Art

Many electrical wiring devices have a line side, which is connectable to an electrical power supply, and a load side, which is connectable to one or more loads and at least one conductive path between the line and load sides. Electrical connections to wires supplying electrical power or wires conducting electricity to the one or more loads are at line side and load side connections. The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters (GFCI), for example. A more detailed description of a GFCI device is provided in U.S. Pat. No. 4,595,894, which is incorporated herein in its entirety by reference. Presently available GFCI devices, such as the device described in commonly owned U.S. Pat. No. 4,595,894 (the '894 patent), use an electrically activated trip mechanism to mechanically break an electrical connection between the line side and the load side. Such devices are resettable after they are tripped by, for example, the detection of a ground fault. In the device discussed in the '894 patent, the trip mechanism used to cause the mechanical breaking of the circuit (i.e., the conductive path between the line and load sides) includes a solenoid (or trip coil). A test button is used to test the trip mechanism and circuitry used to sense faults, and a reset button is used to reset the electrical connection between line and load sides.

However, instances may arise where an abnormal condition, caused by for example a lightning strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (versus load) side of the GFCI device, an instance may arise where a current path is created from the phase (or hot) wire supplying power to the GFCI device through the load side of the device and a person to ground. In the event that an open neutral condition exists, current GFCI devices, which have tripped, may be reset even though the open neutral condition may remain.

Commonly owned U.S. Pat. No. 6,040,967 having Ser. No. 09/138,955 with a filing date of Aug. 24, 1998, which is incorporated herein in its entirety by reference, describes a family of resettable circuit interrupting devices capable of locking out the reset portion of the device if the circuit interrupting portion is non-operational or if an open neutral condition exists.

Some of the circuit interrupting devices described above have a user accessible load side connection in addition to the line and load side connections. The user accessible load side connection includes one or more connection points where a user can externally connect to the electrical power supplied from the line side. The load side connection and user accessible load side connection are typically electrically connected together. An example of such a circuit interrupting device is a GFCI receptacle, where the line and load side connections are binding screws and the user accessible load side connection is a typical two or three hole receptacle used in power outlets for connection to electrical devices typically using a three-prong or two-prong male plug. As noted, such devices are connected to external wiring so that line wires are connected to the line side connection and load side wires are connected to the load side connection. However, instances may occur where the circuit interrupting device is improperly connected to the external wires so that the load wires are connected to the line side connection and the line wires are connected to the load connection. This is known as reverse wiring. In the event the circuit interrupting device is reverse wired, fault protection to the user accessible load connection may be eliminated, even if fault protection to the load side connection remains. Further, because fault protection is eliminated the user accessible terminals (i.e., three hole or two hole receptacles) will have electrical power making a user think that the device is operating properly when in fact it is not. Therefore, there exists a need to detect faults when the circuit interrupting device is reverse wired. Also, there exists a need to prevent a device from being reverse wired. Further, there exists a need to prevent the user accessible load terminals from having electrical power when the circuit interrupting device is reverse wired or when the circuit interrupting device is not operating properly.

SUMMARY

The present invention relates to a family of resettable circuit interrupting devices that prevents electric power from being accessible to users of such devices when these devices are reversed wired. The devices have a reset lockout mechanism that prevents them from being reset when they are not operating properly. When the devices are not reset and if such devices are reverse wired no power is available to any user accessible receptacles and/or plugs located on the face of the devices. Each of the devices of the present invention has at least one pair of line terminals, one pair of load terminals and one pair of face terminals. The line terminals are capable of being electrically connected to a source of power. The load terminals are capable of being electrically connected to a load and are improperly connected to electrical power when the device is reverse wired. The face terminals are electrically connected to user accessible plugs and/or receptacles located on the face of a device for example. The line, load and face terminals are electrically isolated from each other. The devices of the present invention are manufactured and shipped in a trip condition, i.e., no electrical connection between line terminals and load terminals and no electrical connection between the load terminals and face terminals. Thus, in the trip condition the at least three terminals are electrically isolated from each other.

Each of the pairs of terminals has a phase terminals and a neutral terminal. A phase conducting path is created when the corresponding phase terminals are connected to each other. Similarly a neutral conducting path is created when the corresponding neutral terminals are connected to each other. Preferably, the phase conductive path includes one or more switch devices that are capable of opening to cause electrical discontinuity in the phase conductive path and capable of closing to reestablish the electrical continuity in the phase conductive paths. Also, the neutral conductive path includes one or more switch devices that are capable of opening to cause electrical discontinuity in the neutral conductive path and capable of closing to reestablish the electrical continuity in the neutral conductive paths.

The devices of the present invention each further has a pair of movable bridges which are electrically connected to the line terminals. The movable bridges electrically connect the line terminals to the load and face terminals when the devices are reset thus bringing power to the face of the devices. The movable bridges are mechanically biased away from the load and face terminals. When the devices are improperly wired or reverse wired (i.e., power connected to load terminals), the reset lockout mechanism prevents the movable bridges from connecting the line terminals to the load and face terminals even when an attempt is made to reset the device thus preventing electric power to be present at the face terminals or user accessible plugs and/or receptacles.

In one embodiment, the circuit interrupting device comprises a housing within which the line terminals, the movable bridges, the load terminals and the face terminals are at least partially disposed. The circuit interrupting device also comprises a circuit interrupting portion that is disposed within the housing and configured to cause electrical discontinuity between the terminals upon the occurrence of a predetermined condition. The circuit interrupting device further comprises a trip portion, a reset portion and a sensing circuit.

One embodiment for the circuit interrupting device uses an electromechanical circuit interrupting portion that causes electrical discontinuity between the line, load and face terminals. The reset lockout mechanism prevents the reestablishing of electrical continuity between the line, load and face terminals unless the circuit interrupting portion is operating properly. That is, the reset lockout prevents resetting of the device unless the circuit interrupting portion is operating properly. The reset portion allows the device to be reset causing electrical continuity between the line terminals and the load terminals and electrical continuity between the line terminals and the face terminals; i.e., device in set or reset mode. Also, there is electrical continuity between the load terminals and the face terminals when the device is reset. Thus the reset portion establishes electrical continuity between the line, load and face terminals. The electromechanical circuit interrupting portion comprises a latch plate and lifter assembly, a coil and plunger assembly, a mechanical switch assembly, the movable bridges and the sensing circuit.

The reset portion comprises a reset pin connected to a reset button; the button and reset pin are mechanically biased and said reset pin has a flange (e.g., circular flange or disk) extending radially from an end portion of the reset pin for interference with the latch plate and lifter assembly when the reset button is depressed while the device is in the trip condition. The interfered latch plate and lifter assembly engages the mechanical switch assembly which triggers the sensing circuit. If the circuit interrupting portion is operating properly, the triggered sensing circuit causes a coil assembly coupled to the sensing circuitry to be energized. The energized coil assembly, which has a movable plunger located therein, causes the movable plunger to engage the latch plate allowing the end portion of the reset pin and the flange to go through momentarily aligned openings in the latch plate and lifter assembly. The openings then become misaligned trapping the flange and the end portion of the reset pin underneath the lifter. The flange now interferes with the latch plate and lifter assembly from underneath the lifter. The biasing of the reset pin is such that the reset pin tends to move away from the latch and lifter assembly when the button is released after having been depressed. Upon release of the reset button, the biasing of the reset pin in concert with its interfering flange allow it to lift the latch plate and lifter assembly. Thus, the lifter portion of the latch plate and lifter assembly engages with the movable bridges causing the bridges to electrically connect the line, load and face terminals to each other thus putting the device in a set or reset condition. If the circuit interrupting portion is not operating properly the plunger of the coil assembly does not engage the latch plate and lifter assembly thus preventing the circuit interrupting device from being reset.

The sensing circuit comprises various electrical and electronic components for detecting the occurrence of a predetermined condition. The sensing circuitry is coupled to the electromechanical circuit interrupting portion. Upon detection of a predetermined condition the sensing circuitry activates the electromechanical circuit interrupter causing the device to be in the trip condition.

The trip condition is obtained by activating the trip portion of the circuit interrupting device. The trip portion of the circuit interrupting device is disposed at least partially within the housing and is configured to cause electrical discontinuity in the phase and/or neutral conductive paths. The trip condition can also occur when the device detects a predetermined condition (e.g., ground fault) while in the reset mode. In one embodiment, the trip portion comprises a test button connected to a trip pin having a cam or angled portion at its end which cam portion can engage the latch plate when the device has been reset. The trip pin and the test button are mechanically biased such that the trip pin tends to move away from the latch and lifter assembly when the test button is released after having been depressed. The trip portion when activated (i.e., test button is depressed), while the device is in the reset mode, causes the cam portion of the trip pin to engage the latch plate momentarily aligning the lifter and latch plate openings; this allows the end portion and flange of the reset pin to be released from underneath the lifter and thus no longer interfere with the lifter and latch plate assembly. As a result the lifter and latch plate no longer lift the movable bridges and the biasing of the movable bridges causes them to move away from the load and face terminals disconnecting the line, load and face terminals from each other thus putting the device in the trip condition.

BRIEF DESCRIPTION OF THE DRAWINGS

Preferred embodiments of the present application are described herein with reference to the drawings, in which similar elements are given similar reference characters, wherein.

DETAILED DESCRIPTION

Figure 1:
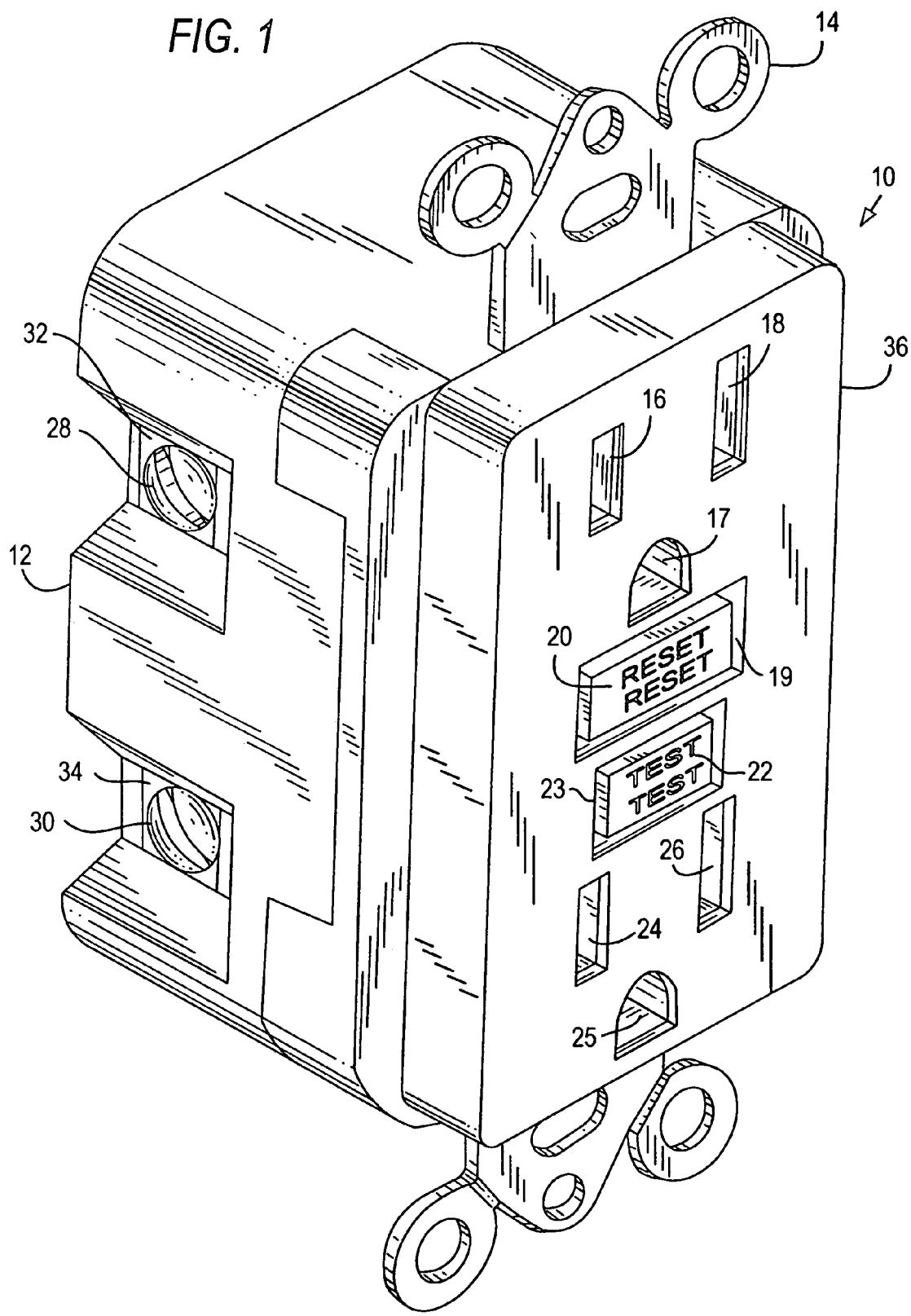
FIG. 1 is a perspective view of one embodiment of a ground fault circuit interrupting device according to the present application.

The present application contemplates various types of circuit interrupting devices that have at least one conductive path. The conductive path is typically divided between a line side that connects to electrical power, a load side that connects to one or more loads and a user side that connects to user accessible plugs or receptacles. As noted, the various devices in the family of resettable circuit interrupting devices comprise: ground fault circuit interrupters (GFCI's), arc fault circuit interrupters (AFCI's), immersion detection circuit interrupters (IDCI's), appliance leakage circuit interrupters (ALCI's) and equipment leakage circuit interrupters (ELCI's).

For the purpose of the present application, the structure or mechanisms used in the circuit interrupting devices, shown in the drawings and described hereinbelow, are incorporated into a GFCI device suitable for installation in a single-gang junction box used in, for example, a residential electrical wiring system. However, the mechanisms according to the present application can be included in any of the various devices in the family of resettable circuit interrupting devices. Further, more generally the circuit interrupting device of the present invention can be implemented as any device having at least a first, second, and third electrical conductor each of which is at least partially disposed in a housing. The electrical conductors are electrically isolated from each other with the first conductor capable of being connected to electrical power, the second conductor capable of being connected to one or more loads and the third conductor configured to be accessible to users. At least one movable bridge, one end of which is connected to the source of power and the first conductor, is able to connect the first, second and third electrical conductors to each other and disconnect said conductors from each other when a fault or predetermined condition is detected.

More specifically, however, the circuit interrupting devices described herein have at least three pairs of electrically isolated terminals: at least one pair of line terminals, at least one pair of load terminals and at least one pair of user or face terminals. The at least one pair of line terminals permits electrical power (e.g., alternating current (AC) to be connected to the device and the at least one pair of load terminals permits external conductors or appliances to be connected to the device. These connections may be, for example, electrical fastening devices that secure or connect external conductors to the circuit interrupting device, as well as conduct electricity. Examples of such connections include binding screws, lugs, terminals and external plug connections. The at least one face or user terminal, which typically is implemented using two-prong or three-prong receptacles, allows users to electrically connect electrical devices to the GFCI device typically via the two-prong or three-prong male plugs that mate with the receptacles.

The above-described features can be incorporated in any resettable circuit interrupting device, but for the sake of explanation the description to follow is directed to a GFCI device.

In one embodiment, the GFCI device has a circuit interrupting portion, a reset portion and a reset lockout mechanism. The GFCI device also has a mechanical trip portion. The GFCI device further has a pair of movable bridges that, when engaged, connect the line terminals to load and face terminals. When the bridge is not engaged, the line, load and face terminals are electrically isolated from each other. Because the face terminals are electrically isolated from the load and line terminals, there will be no power at the face terminals even if the GFCI device is reverse wired (power connected to load terminals instead of line terminals). When the movable bridge is not engaged and thus the line, load and face terminals are electrically isolated from each other, the device is said to be in a tripped condition.

The circuit interrupting and reset portions described herein preferably use electro-mechanical components to break (open) and make (close) one or more conductive paths between the line and load terminals of the device and also between the line and face terminals. However, electrical components, such as solid state switches and supporting circuitry, may be used to open and close the conductive paths.

Generally, the circuit interrupting portion is used to automatically break electrical continuity in one or more conductive paths (i.e., open the conductive path) between the line and load terminals upon the detection of a fault, which in the embodiment described is a ground fault. Electrical continuity is also broken between the line and face terminals. The reset portion is used to close the open conductive paths.

In this configuration, the operation of the reset and reset lockout portions is in conjunction with the operation of the circuit interrupting portion, so that electrical continuity in open conductive paths cannot be reset if the circuit interrupting portion is non-operational, if an open neutral condition exists and/or if the device is reverse wired. When the circuit interrupting portion is non-operational—meaning that any one or more of its components is not operating properly—the device cannot be reset. The mechanical trip portion is able to break electrical continuity between the line, load and face terminals independently of the operation of the circuit interrupting portion. Thus, in the event the circuit interrupting portion is not operating properly, the device can still be tripped.

Turning now to FIG. 1, the GFCI device has a housing 12 to which a face or cover portion 36 is removably secured.

The face portion 36 has entry ports 16, 18, 24 and 26 aligned with receptacles for receiving normal or polarized prongs of a male plug of the type normally found at the end of a household device electrical cord (not shown), as well as ground-prong-receiving openings 17 and 25 to accommodate three-wire plugs. The GFCI device also includes a mounting strap 14 used to fasten the device to a junction box.

A test button 22 extends through opening 23 in the face portion 36 of the housing 12. The test button is used to set the device 10 to a trip condition. The circuit interrupting portion, to be described in more detail below, is used to break electrical continuity in one or more conductive paths between the line and load side of the device. A reset button 20 forming a part of the reset portion extends through opening 19 in the face portion 36 of the housing 12. The reset button is used to activate a reset operation, which reestablishes electrical continuity in the open conductive paths.

Still referring to FIG. 1, electrical connections to existing household electrical wiring are made via binding screws 28 and 30 where, for example, screw 30 is an input (or line) phase connection, and screw 28 is an output (or load) phase connection. Screws 28 and 30 are fastened (via a threaded arrangement) to terminals 32 and 34 respectively. However, the GFCI device can be designed so that screw 30 can be an output phase connection and screw 28 an input phase or line connection. Terminals 32 and 34 are one half of terminal pairs. Thus, two additional binding screws and terminals (not shown) are located on the opposite side of the device 10. These additional binding screws provide line and load neutral connections, respectively. It should also be noted that the binding screws and terminals are exemplary of the types of wiring terminals that can be used to provide the electrical connections. Examples of other types of wiring terminals include set screws, pressure clamps, pressure plates, push-in type connections, pigtails and quick-connect tabs. The face terminals are implemented as receptacles configured to mate with male plugs. A detailed depiction of the face terminals is shown in FIG. 2.

Figure 2:
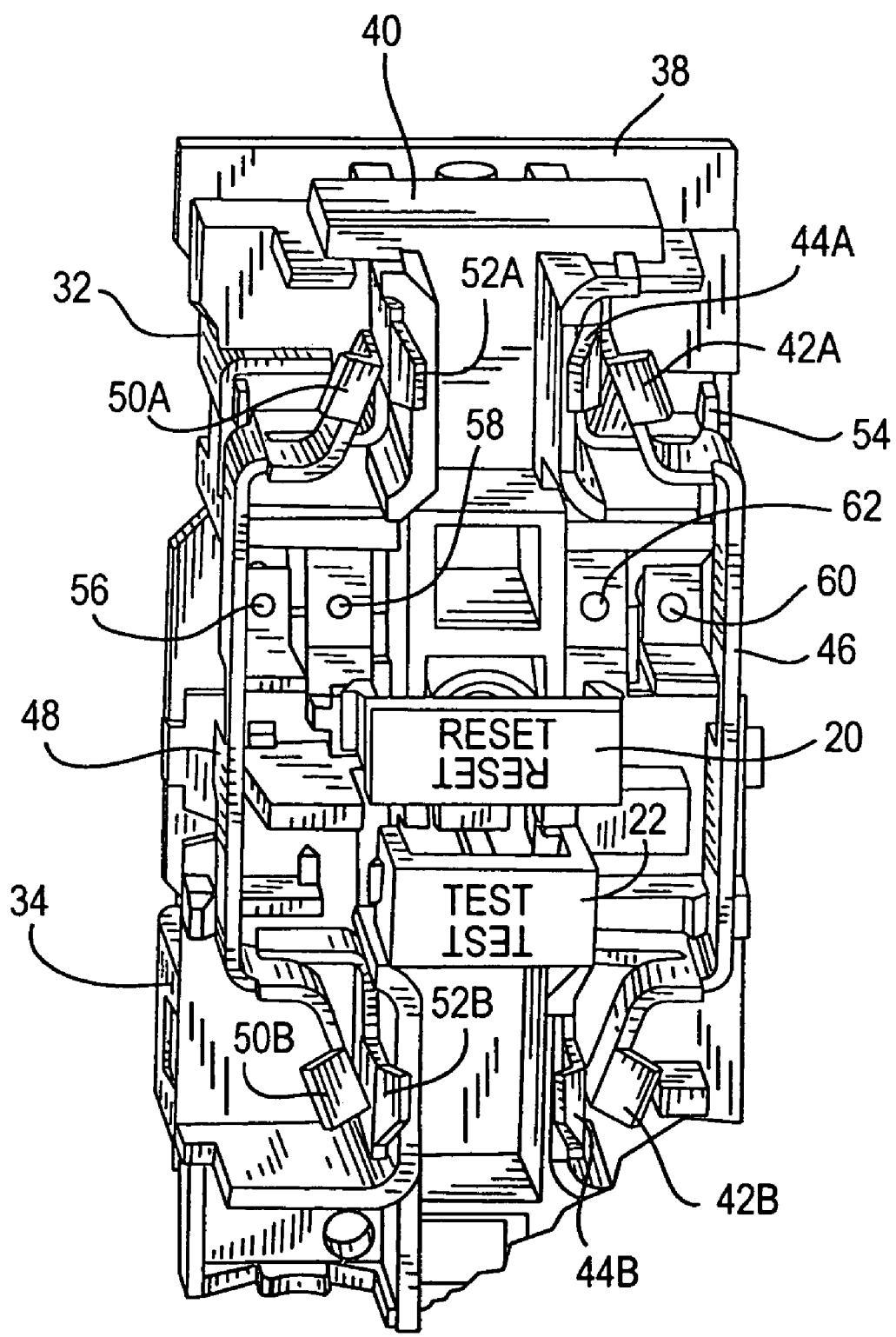
FIG. 2 is top view of a portion of the GFCI device shown in FIG. 1, with the face portion removed.

Referring to FIG. 2, a top view of the GFCI device (without face portion 36 and strap 14) is shown. An internal housing structure 40 provides the platform on which the components of the GFCI device are positioned. Reset button 20 and test button 22 are mounted on housing structure 40. Housing structure 40 is mounted on printed circuit board 38. The receptacle aligned to opening 16 of face portion 36 is made from extensions 50A and 52A of frame 48. Frame 48 is made from an electricity conducting material from which the receptacles aligned with openings 16 and 24 are formed. The receptacle aligned with opening 24 of face portion 36 is constructed from extensions 50B and 52B of frame 48. Also, frame 48 has a flange the end of which has electricity conducting contact 56 attached thereto. Frame 46 is an electricity conducting material from which receptacles aligned with openings 18 and 26 are formed. The receptacle aligned with opening 18 of frame portion 36 is constructed with frame extensions 42A and 44A. The receptacle aligned with opening 26 of face portion 36 is constructed with extensions 42B and 44B. Frame 46 has a flange the end of which has electricity conducting contact 60 attached thereto. Therefore, frames 46 and 48 form the face terminals implemented as receptacles aligned to openings 16, 18, 24 and 26 of face portion 36 of GFCI 10 (see FIG. 1). Load terminal 32 and line terminal 34 are also mounted on internal housing structure 40. Load terminal 32 has an extension the end of which electricity conducting load contact 58 is attached.

Similarly, load terminal 54 has an extension to which electricity conducting contact 62 is attached. The line, load and face terminals are electrically isolated from each other and are electrically connected to each other by a pair of movable bridges. The relationship between the line, load and face terminals and how they are connected to each other is shown in FIG. 3.

Figure 3:
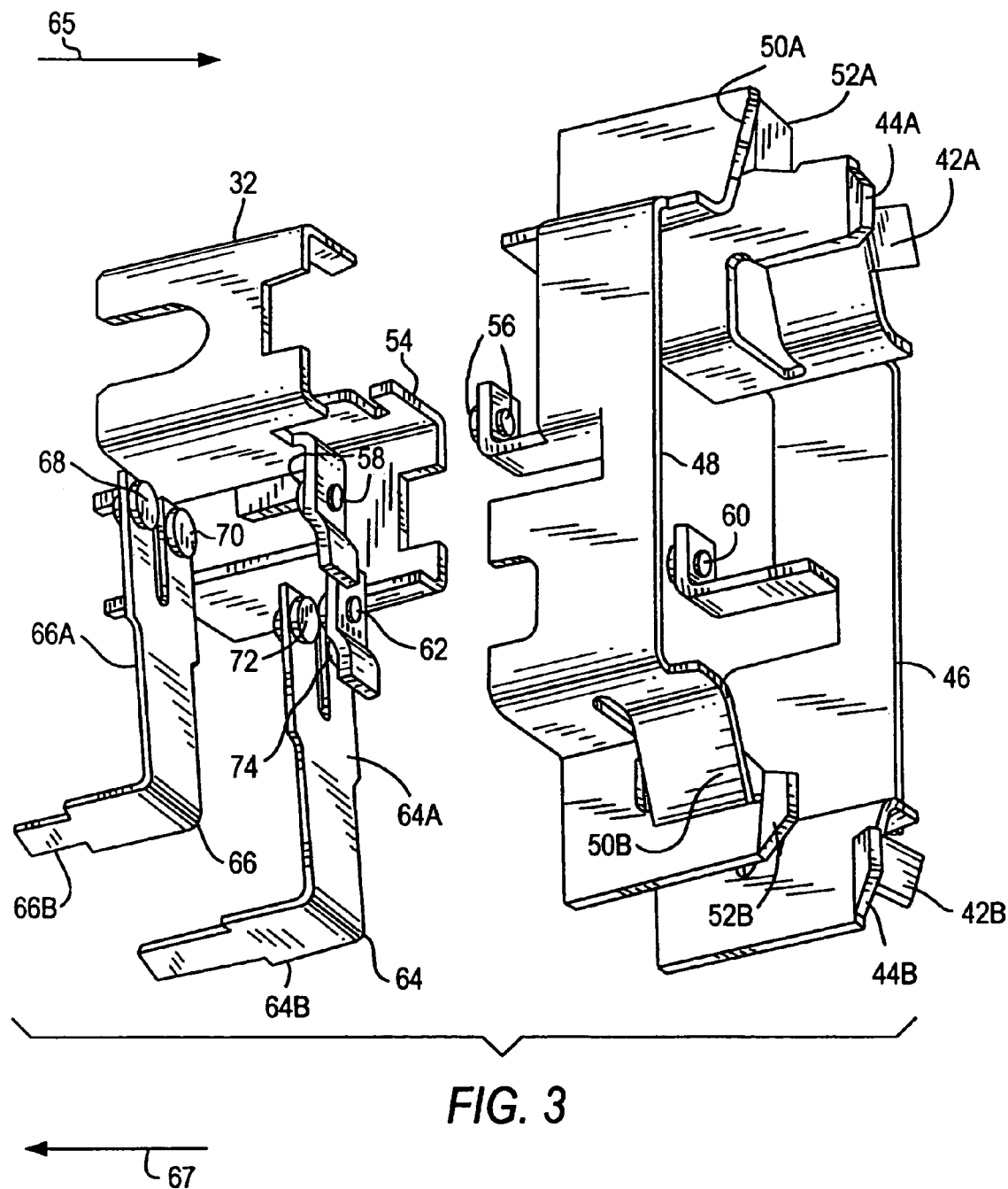
FIG. 3 is an exploded perspective view of the face terminal internal frames, the load terminals and the movable bridges.

Referring now to FIG. 3, there is shown the positioning of the face and load terminals with respect to each other and their interaction with the movable bridges (64, 66). Although the line terminals are not shown, it is understood that they are electrically connected to one end of the movable bridges. The movable bridges (64, 66) are generally electrical conductors that are configured and positioned to connect at least the line terminals to the load terminals. In particular movable bridge 66 has bent portion 66B and connecting portion 66A. Bent portion 66B is electrically connected to line terminal 34 (not shown). Similarly, movable bridge 64 has bent portion 64B and connecting portion 64A. Bent portion 64B is electrically connected to the other line terminal (not shown); the other line terminal being located on the side opposite that of line terminal 34. Connecting portion 66A of movable bridge 66 has two fingers each having a bridge contact (68, 70) attached to its end. Connecting portion 64A of movable bridge 64 also has two fingers each of which has a bridge contact (72, 74) attached to its end. The bridge contacts (68, 70, 72 and 74) are made from relatively highly conductive material. Also, face terminal contacts 56 and 60 are made from relatively highly conductive material. Further, the load terminal contacts 58 and 62 are made from relatively highly conductive material. The movable bridges are preferably made from flexible metal that can be bent when subjected to mechanical forces. The connecting portions (64A, 66A) of the movable bridges are mechanically biased downward or in the general direction shown by arrow 67. When the GFCI device is reset the connecting portions of the movable bridges are caused to move in the direction shown by arrow 65 and engage the load and face terminals thus connecting the line, load and face terminals to each other. In particular connecting portion 66A of movable bridge 66 is bent upward (direction shown by arrow 65) to allow contacts 68 and 70 to engage contacts 56 of frame 48 and contact 58 of load terminal 32 respectively. Similarly, connecting portion 64A of movable bridge 64 is bent upward (direction shown by arrow 65) to allow contacts 72 and 74 to engage contact 62 of load terminal 54 and contact 60 of frame 46 respectively. The connecting portions of the movable bridges are bent upwards by a latch/lifter assembly positioned underneath the connecting portions where this assembly moves in an upward direction (direction shown by arrow 65) when the GFCI is reset as will be discussed herein below with respect to FIG. 14. It should be noted that the contacts of a movable bridge engaging a contact of a load or face terminals occurs when electric current flows between the contacts; this is done by having the contacts touch each other. Some of the components that cause the connecting portions of the movable bridges to move upward are shown in FIG. 4.

Figure 4:
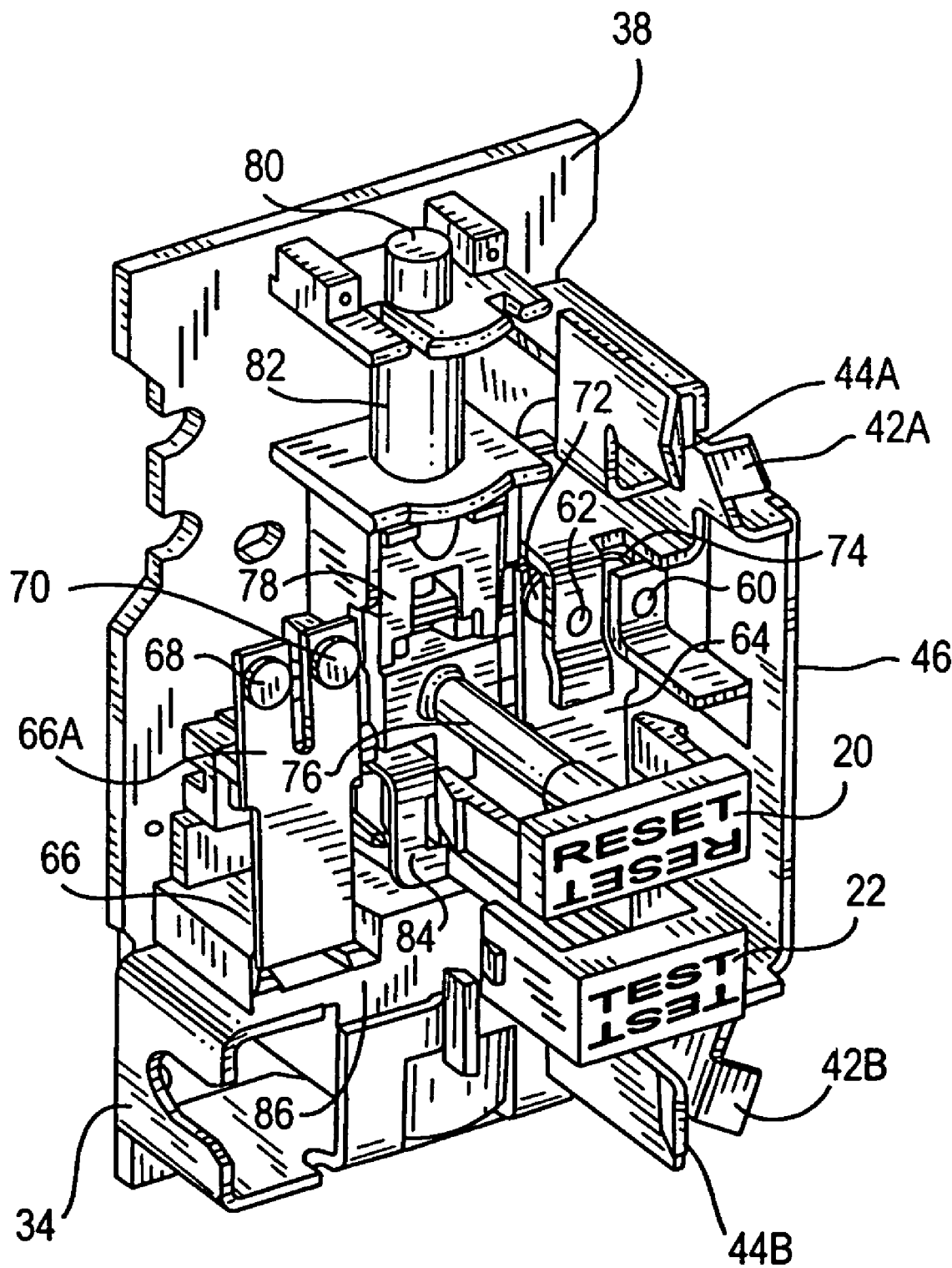
FIG. 4 is a perspective view of the arrangement of some of the components of the circuit interrupting portion of the device of the present invention.

Referring now to FIG. 4, there is shown mounted on printed circuit board 38 a coil plunger combination comprising bobbin 82 having a cavity in which elongated cylindrical plunger 80 is slidably disposed. For clarity of illustration frame 48 and load terminal 32 are not shown. One end of plunger 80 is shown extending outside of the bobbin cavity. The other end of plunger 80 (not shown) is coupled to or engages a spring that provides the proper force for pushing a portion of the plunger outside of the bobbin cavity after the plunger has been pulled into the cavity due to a resulting magnetic force when the coil is energized. Electrical wire (not shown) is wound around bobbin 82 to form the coil. For clarity of illustration the wire wound around bobbin 82 is not shown. A lifter 78 and latch 84 assembly is shown where the lifter 78 is positioned underneath the movable bridges. The movable bridges 66 and 64 are secured with mounting brackets 86 (only one is shown) which is also used to secure line terminal 34 and the other line terminal (not shown) to the GFCI device. It is understood that the other mounting bracket 86 used to secure movable bridge 64 is positioned directly opposite the shown mounting bracket. The reset button 20 has a reset pin 76 that engages lifter 78 and latch 84 assembly as will be shown below.

Figure 5:
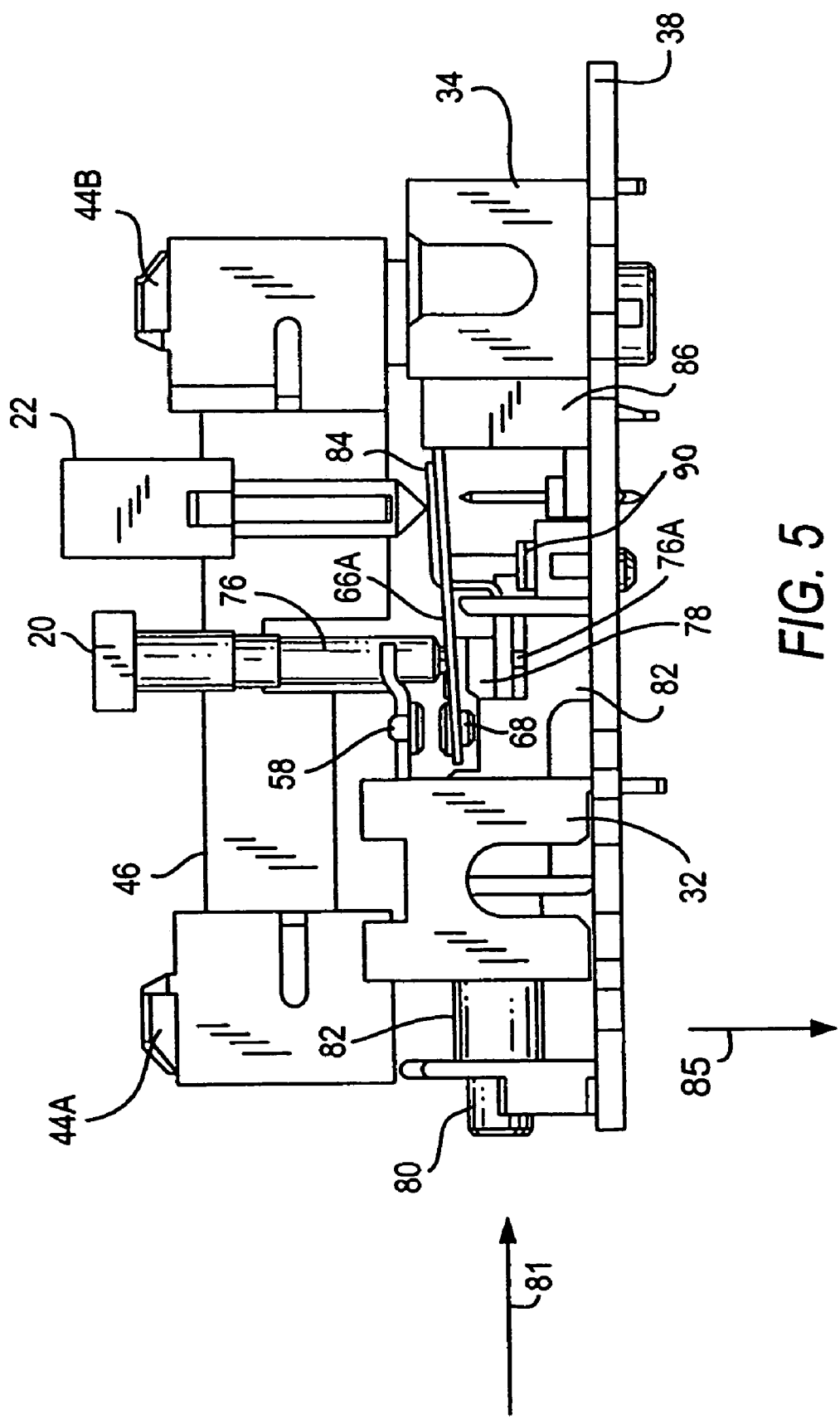
FIG. 5 is a side view of FIG. 4.

Referring now to FIG. 5, there is shown a side view of FIG. 4. When the coil is energized, plunger 80 is pulled into the coil in the direction shown by arrow 81. Connecting portion 66A of movable bridge 66 is shown biased downward (in the direction shown by arrow 85). Although not shown, connecting portion of movable bridge 64 is similarly biased. Also part of a mechanical switch—test arm 90—is shown positioned under a portion of the lifter 78. It should be noted that because frame 48 is not shown, face terminal contact 56 is also not shown.

Figure 6:
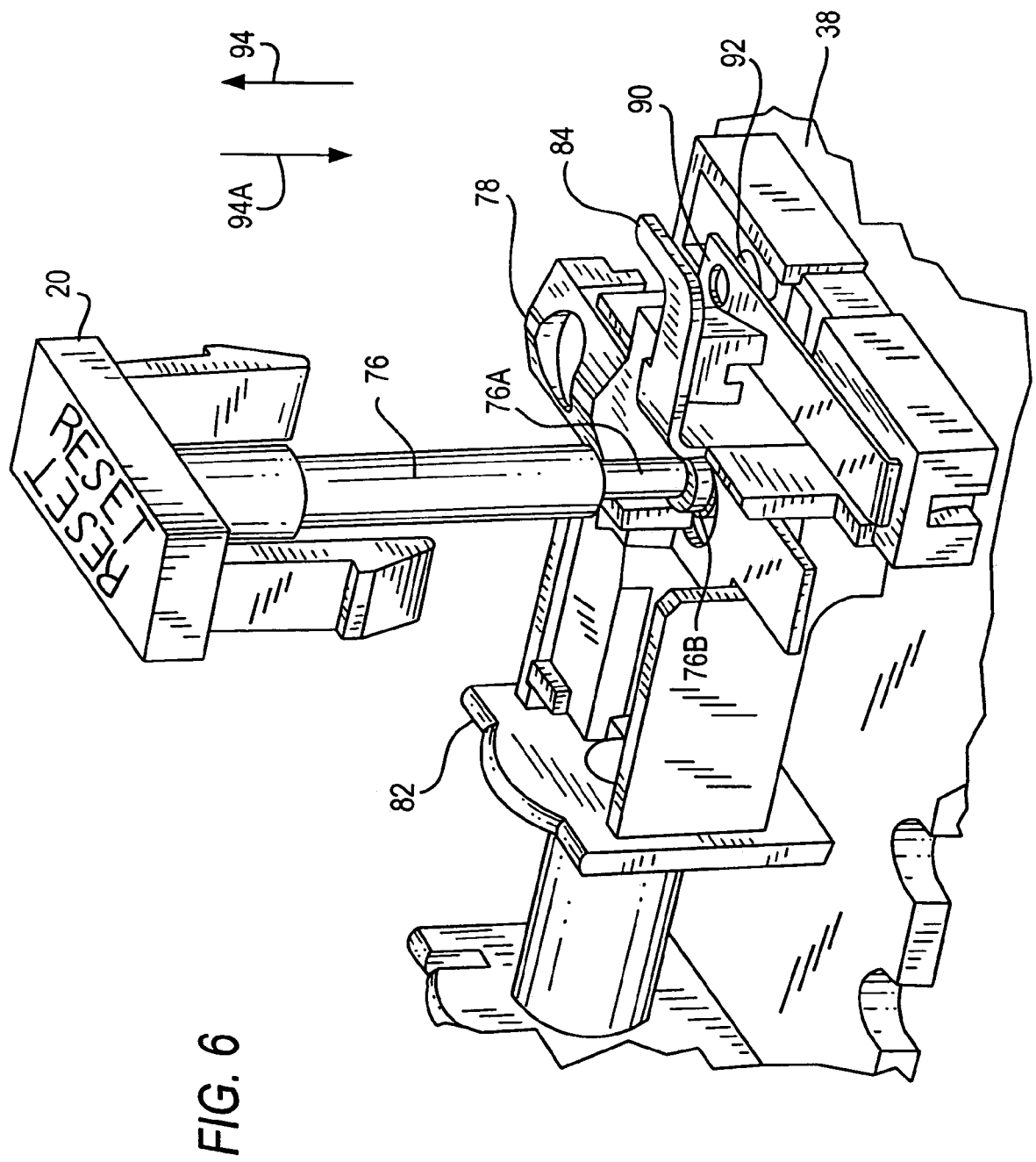
FIG. 6 is a perspective view of the reset portion of the present invention.

Referring now to FIG. 6, there is shown the positioning of the lifter 78, latch 84 assembly relative to the bobbin 82, the reset button 20 and reset pin 76. Note that the reset pin has a lower portion 76A and a disk shape flange 76B. It should be noted that the flange 76 can be any shape, the disk shape flange shown here is one particular embodiment of the type of flange that can be used. The lower portion 76A of the reset pin and flange 76B are positioned so as to extend through aligned openings of the latch 84 and lifter 78. The mechanical switch assembly is also shown positioned underneath a portion of the lifter 78. The mechanical switch assembly comprises test arm 90 and test pin 92 used to cause a trip condition to occur. The reset button 20 and reset pin 76 are biased with a spring coil (not shown) in the upward direction (direction shown by arrow 94). Test arm 90 of the mechanical switch is also biased upward. When the test arm 90 is pressed downward (direction shown by arrow 94A), it will tend to move upward (direction shown by arrow 94) to its original position when released. Similarly, when reset button 20 is depressed (in the direction shown by arrow 94A), it will return to its original position by moving in the direction shown by arrow 94. Latch plate 84 and lifter 78 assembly are mounted on top of bobbin 82. Only a portion of lifter 78 is shown so as to illustrate how lifter 78 engages test arm 90 and how latch plate 84 engages lifter 78. The specific relationship between latch plate 84 and lifter 78 is shown in FIG. 7.

Figure 7:
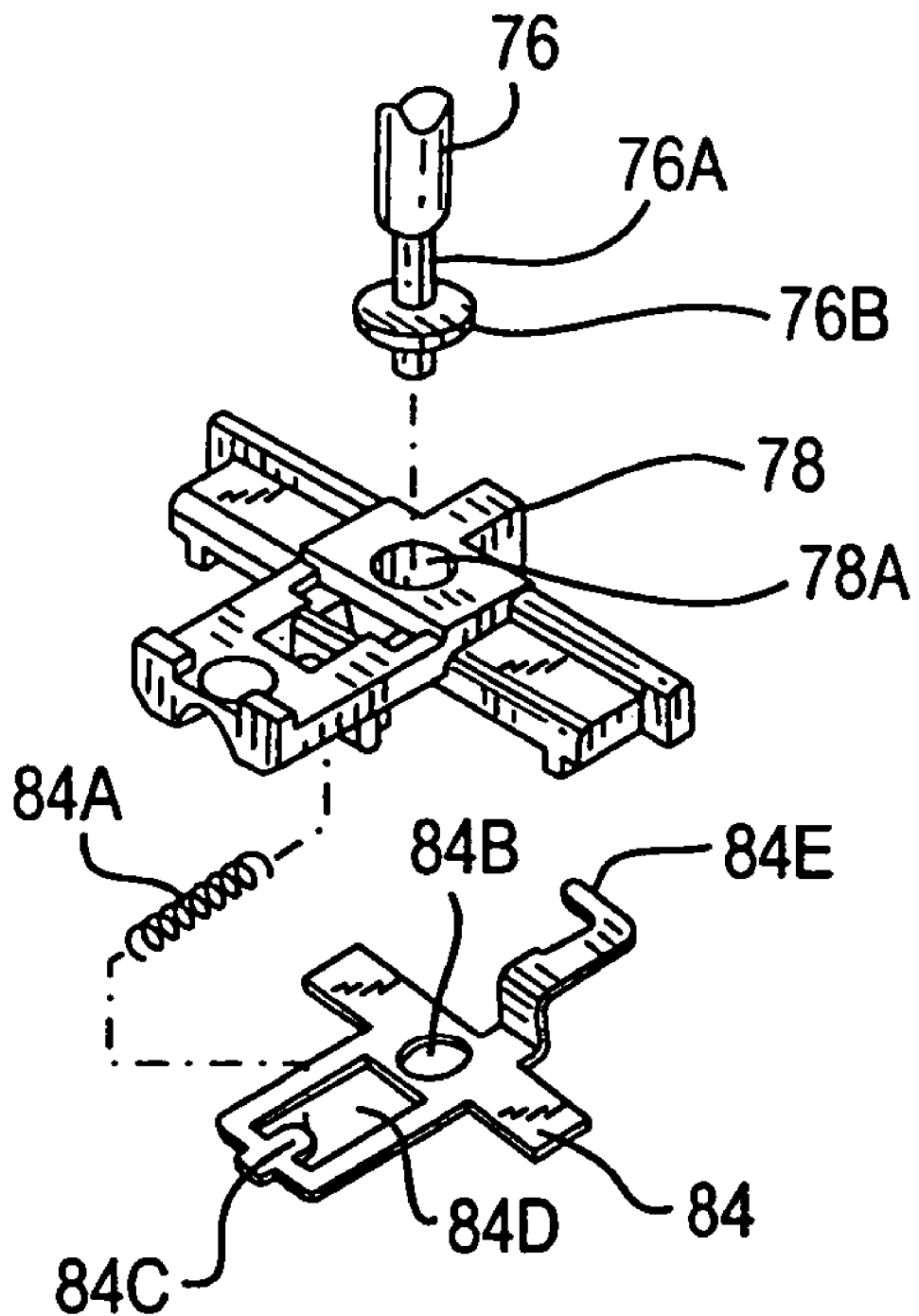
FIG. 7 is an exploded perspective view of the lifter/latch assembly of the circuit interrupting device of the present invention.

Referring now to FIG. 7, there is shown how the latch plate 84 is slidably and springingly mounted to lifter 78. Latch plate 84 has an opening 84B and another opening 84D within which spring coil 84A is positioned. Latch plate stub 84C is use to receive one end of spring coil 84A and the other end of spring coil 84A engages with a detent portion of lifter 78. Latch plate 84 has a hook portion 84E used to engage test button 22 as will be discussed herein below with respect to FIG. 15. Although not part of the latch plate/lifter assembly, reset pin 76, with lower portion 76A and flange 76B is designed to extend through opening 78A of lifter 78 and opening 84B of latch plate 84 when the two openings are aligned to each other. The two openings become aligned with each other when the plunger 80 of the coil plunger assembly engages latch plate 84 as will be discussed herein.

The plunger is caused to be pulled into the cavity of the bobbin 82 when the coil is energized by a sensing circuit when the circuit detects a fault or a predetermined condition. In the embodiment being discussed, the predetermined condition detected is a ground fault. The predetermined condition can be any type of fault such as an arc fault, equipment fault, appliance leakage fault or an immersion detection fault. Generally a fault is an indication that the circuit interrupting device has detected a dangerous condition and has or intends to disconnect power from any loads connected to the device via the load terminals and/or the face terminals. The sensing circuit is shown in FIG. 8.

Figure 8:
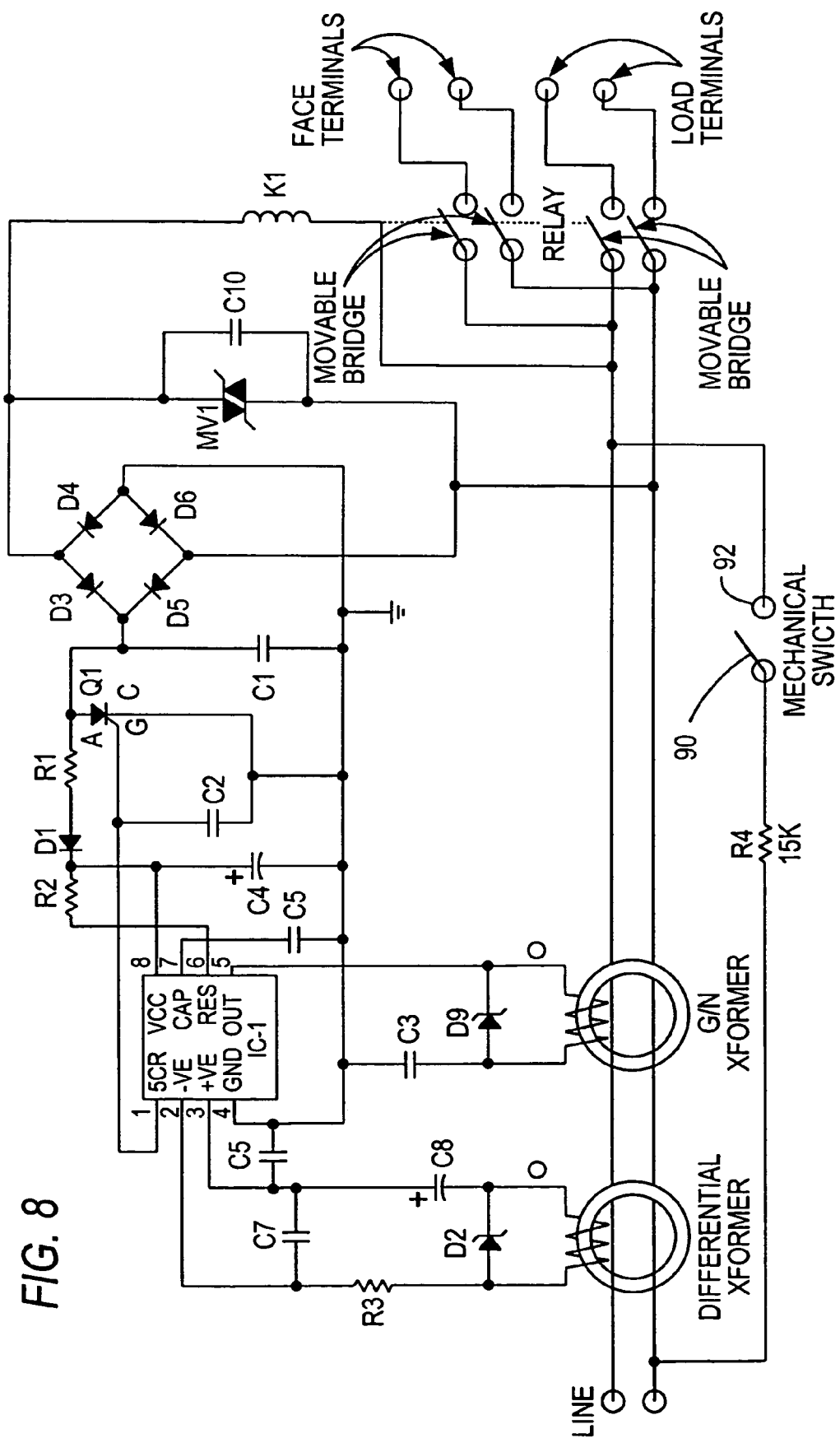
FIG. 8 is a schematic of the sensing circuit.

Referring now to FIG. 8, there is shown a sensing circuit comprising a differential transformer, a Ground/Neutral (G/N) transformer, an integrated circuit (IC-1) for detecting current and outputting a voltage once it detects a current, a full wave bridge rectifier (D3, D4, D5, and D6), a surge suppressor (MV1) for absorbing extreme electrical energy levels that may be present at the line terminals, various filtering coupling capacitors (C1–C9), a gated semiconductor device (Q1), a relay coil assembly (K1), various current limiting resistors (R1–R4) and a voltage limiting zener diode (D2). The mechanical switch—comprising test arm 90 and test pin 92—is shown connected to the conductors of the line terminals in series with current limiting resistor R4. The movable bridges are shown as switches that connect the line terminals to the face and load terminals. The line, load and face terminals are electrically isolated from each other unless connected by the movable bridges. When a predetermined condition—such as a ground fault—occurs, there is a difference in current amplitude between the two line terminals. This current difference is manifested as a net current which is detected by the differential transformer and is provided to IC-1. Integrated circuit IC-1 can be any one of integrated circuits typically used in ground fault circuits (e.g., LM-1851) manufactured National Semiconductor or other well known semiconductor manufacturers. In response to the current provided by the differential transformer, integrated circuit IC-1 generates a voltage on pin 1 which is connected to the gate of Q1. A full wave bridge comprising diodes D3–D6 has a DC side which is connected to the anode of Q1. Q1 is turned on shorting the DC side of the full wave bridge activating relay K1 causing the movable bridges to remove power from the face and load terminals. The relay K1 is implemented with the bobbin 82, coil (not shown) and plunger 80 components. Note diode D1 performs a rectification function retaining the supply voltage to IC-1 when Q1 is turned on. The relay K1 can also be activated when mechanical switch 90 is closed which causes a current imbalance on the line terminal conductors that is detected by the differential transformer. The G/N transformer detects a remote ground voltage that may be present on one of the load terminal conductors and provides a current to IC-1 upon detection of this remote ground which again activates relay K1.

The sensing circuit engages a circuit interrupting portion of the GFCI device causing the device to be tripped. Also, the sensing circuit allows the GFCI device to be reset after it has been tripped if the reset lockout has not been activated as discussed herein below. In the tripped condition the line terminals, load terminals and face terminals are electrically isolated from each other. Thus, even if the device is reverse wired, there will be no power at the face terminals. A GFCI manufactured in accordance to present invention is shipped in the tripped condition. The circuit interrupting portion comprises the coil and plunger (80) assembly, the latch plate (84) and lifter (78) assembly, and the mechanical switch assembly (90, 92).

Figure 9:
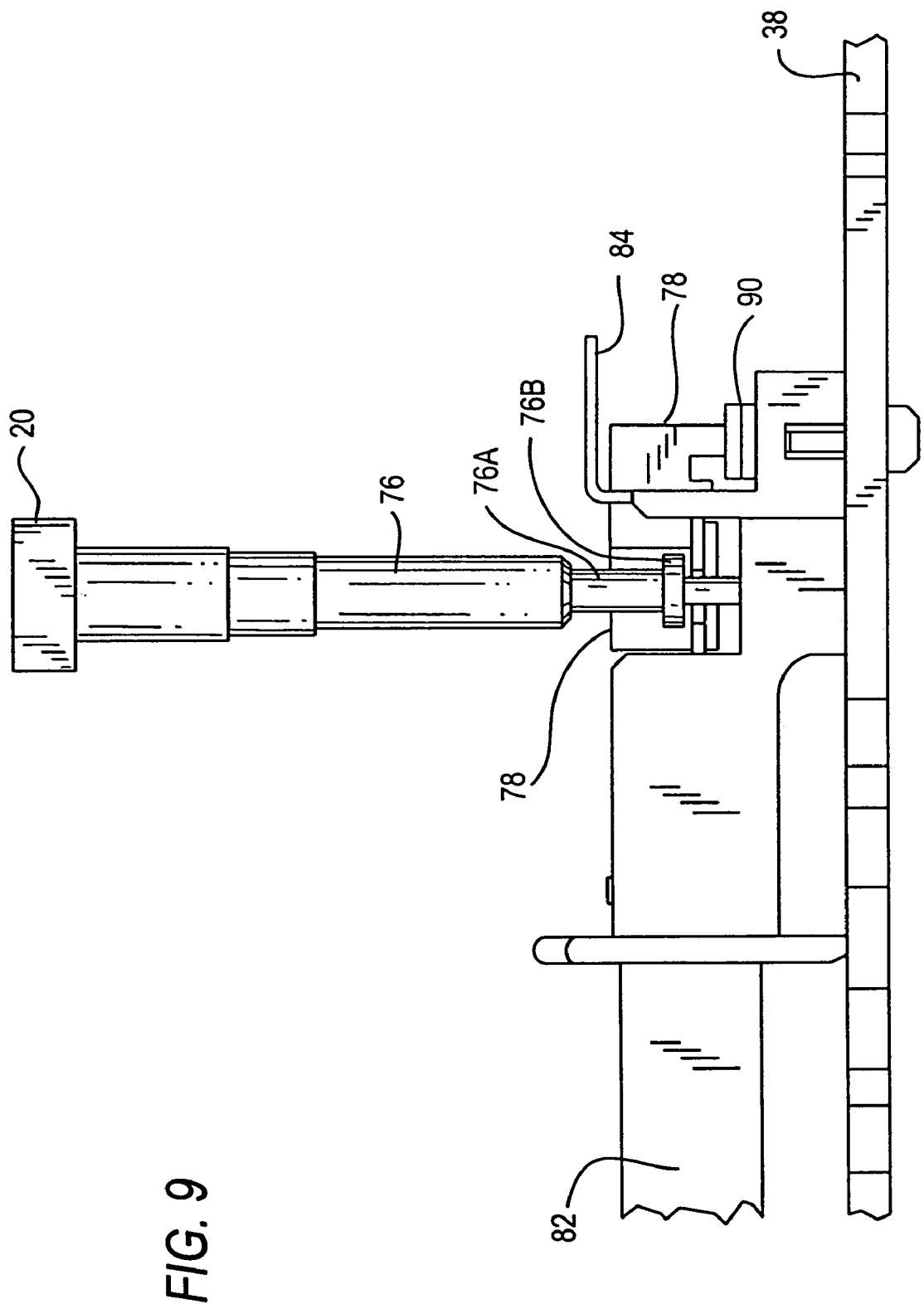
FIGS. 9–14 show the sequence of operation when the device of the present invention is reset from a tripped state.

Referring to FIGS. 9–14, there is shown a sequence of how the GFCI is reset from a tripped condition. When the GFCI device is in a tripped condition, the line, load and face terminals are electrically isolated from each other because the movable bridges are not engaged to any of the terminals. Referring to FIG. 9 there is shown the positioning of the reset button 20, reset pin 76, reset pin lower portion 76A and disk 76B when the device is in the tripped condition. In the tripped condition, the lifter 78 positioned below the movable bridges (not shown) does not engage the movable bridges. Reset button 20 is in its fully up position. Latch 84 and lifter 78 are such that the openings of the latch 84 and the lifter 78 are misaligned not allowing disk 76B to go through the openings. Also a portion of lifter 78 is positioned directly above test arm 90 but does not engage test arm 90.

Figure 10:
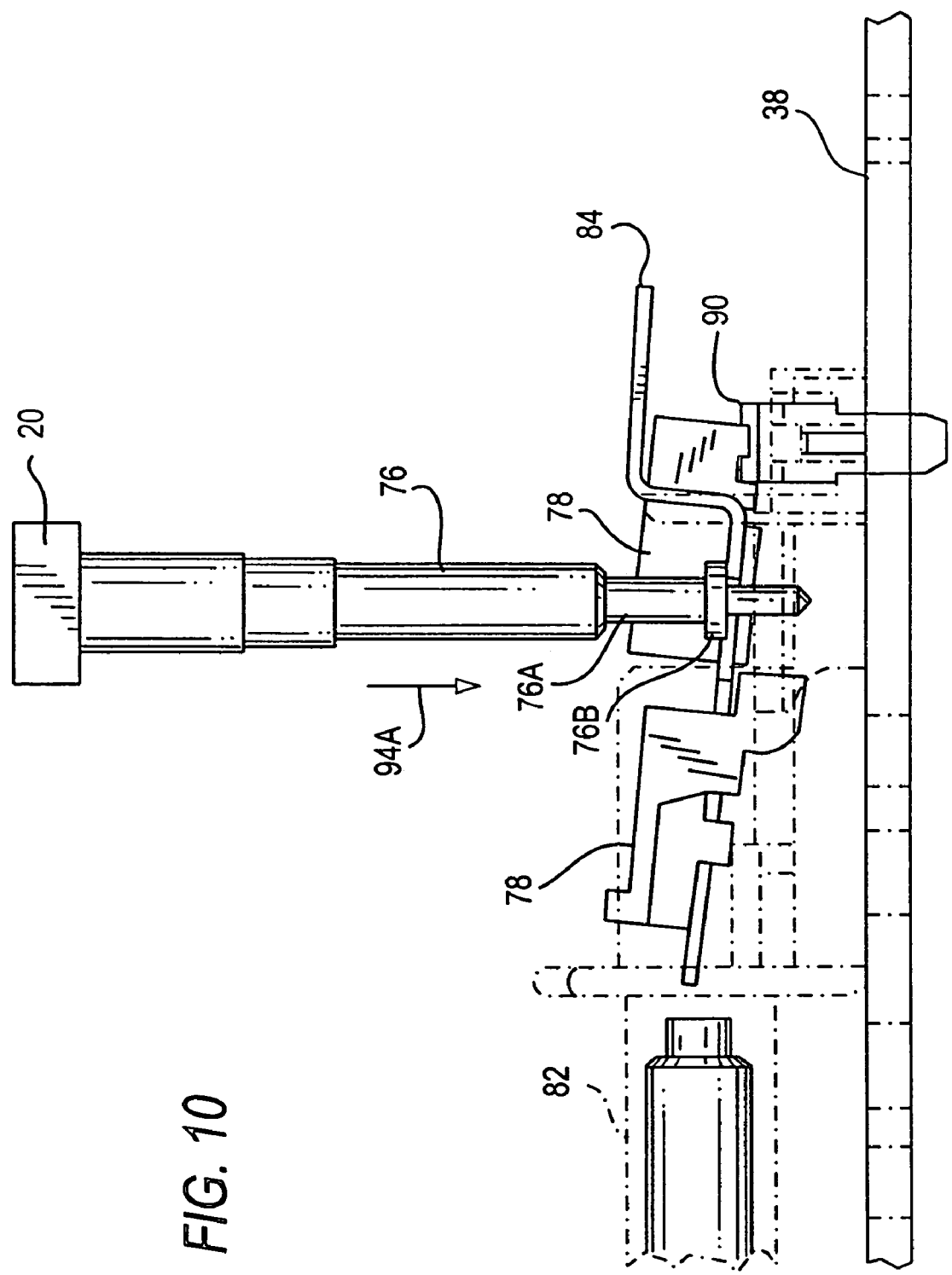

In FIG. 10, to initiate the resetting of the GFCI device, reset button 20 is depressed (in the direction shown by 94A) causing flange 76B to interfere with latch plate 84 as shown which causes lifter 78 to press down on test arm 90 of the mechanical switch. As a result, test arm 90 makes contact with test pin 92 (see FIG. 6).

Figure 11:
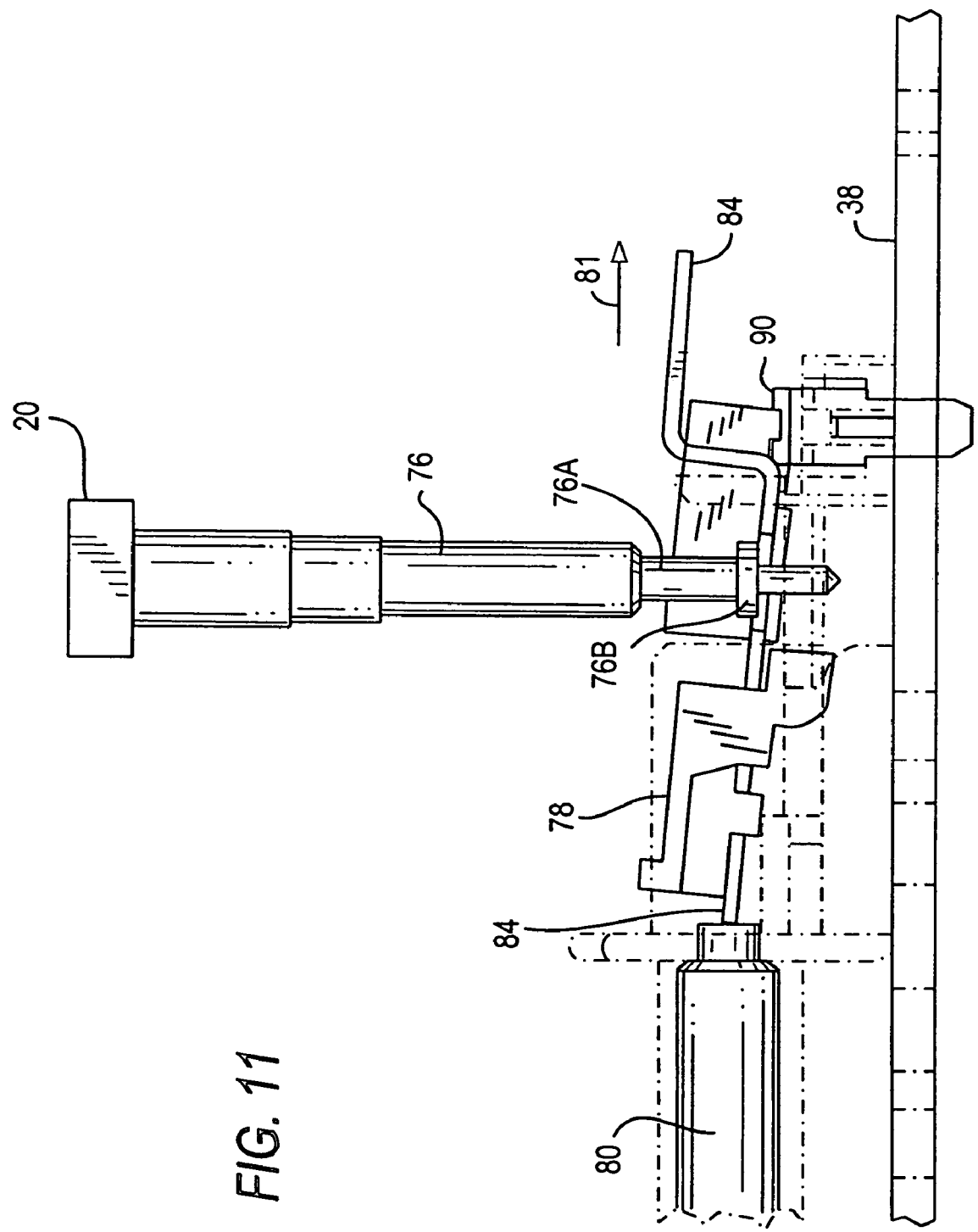

In FIG. 11, when test arm 90 makes contact with test pin 92, the sensing circuit is triggered as explained above, energizing the coil causing plunger 80 to be momentarily pulled into the bobbin 82 engaging latch plate 84 and more specifically pushing momentarily latch plate 84 in the direction shown by arrow 81.

Figure 12:
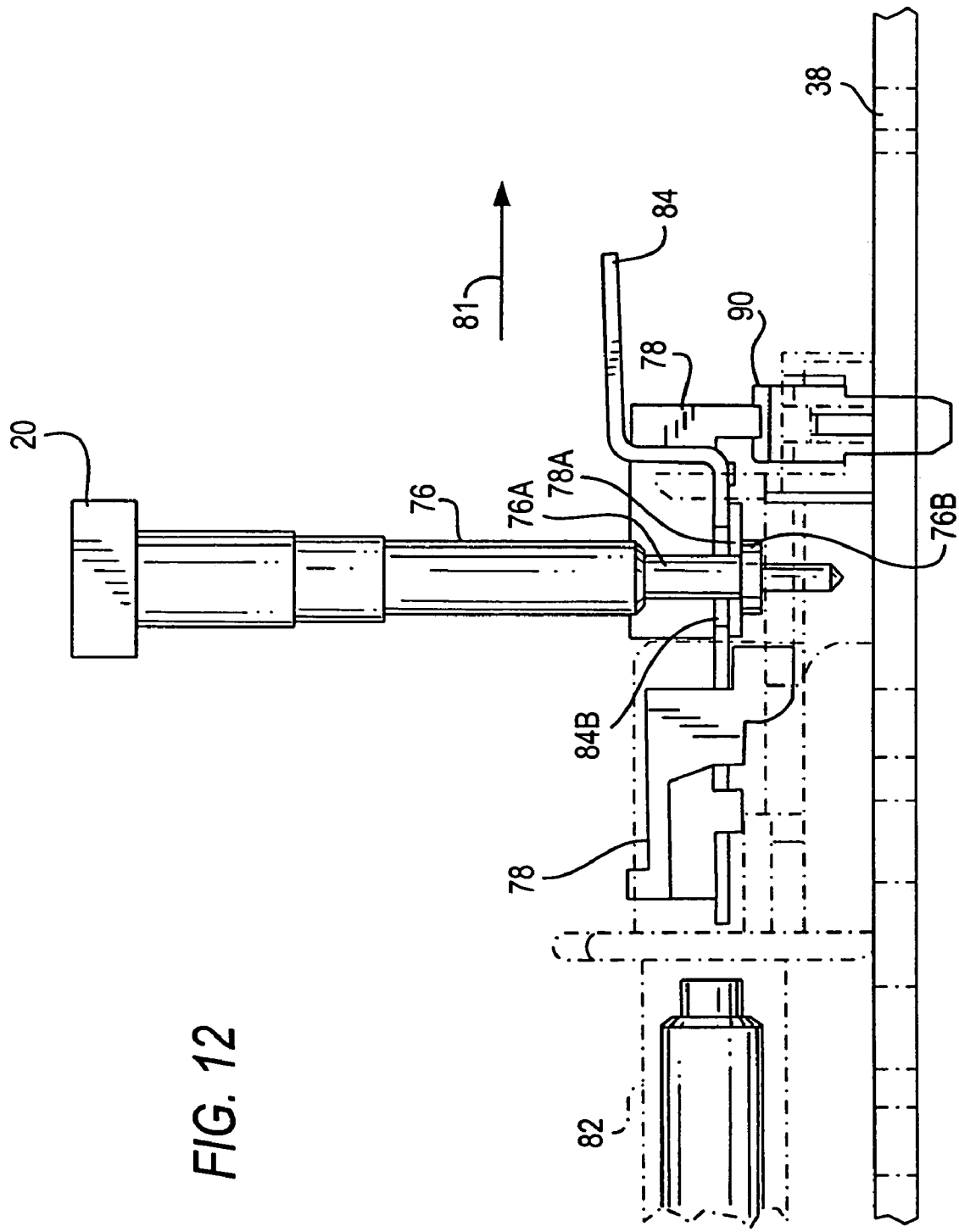

In FIG. 12, the latch plate, when pushed by plunger 80, slides along lifter 78 (in the direction shown by arrow 81) so as to align its opening with the lifter opening allowing flange 76B and part of lower reset pin portion 76A to extend through the openings 84B, 78A (see FIG. 7).

Figure 13:
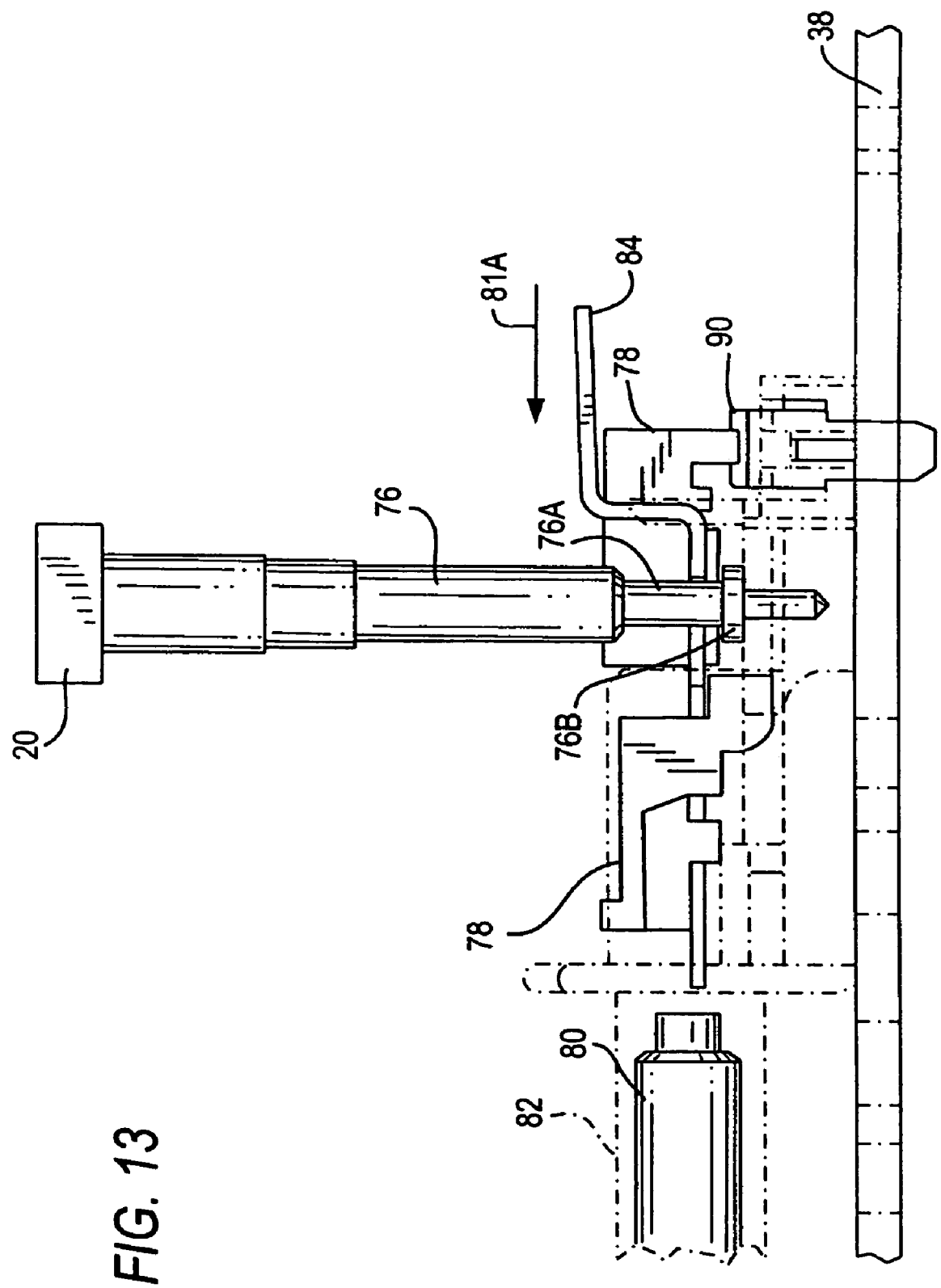
Figure 14:
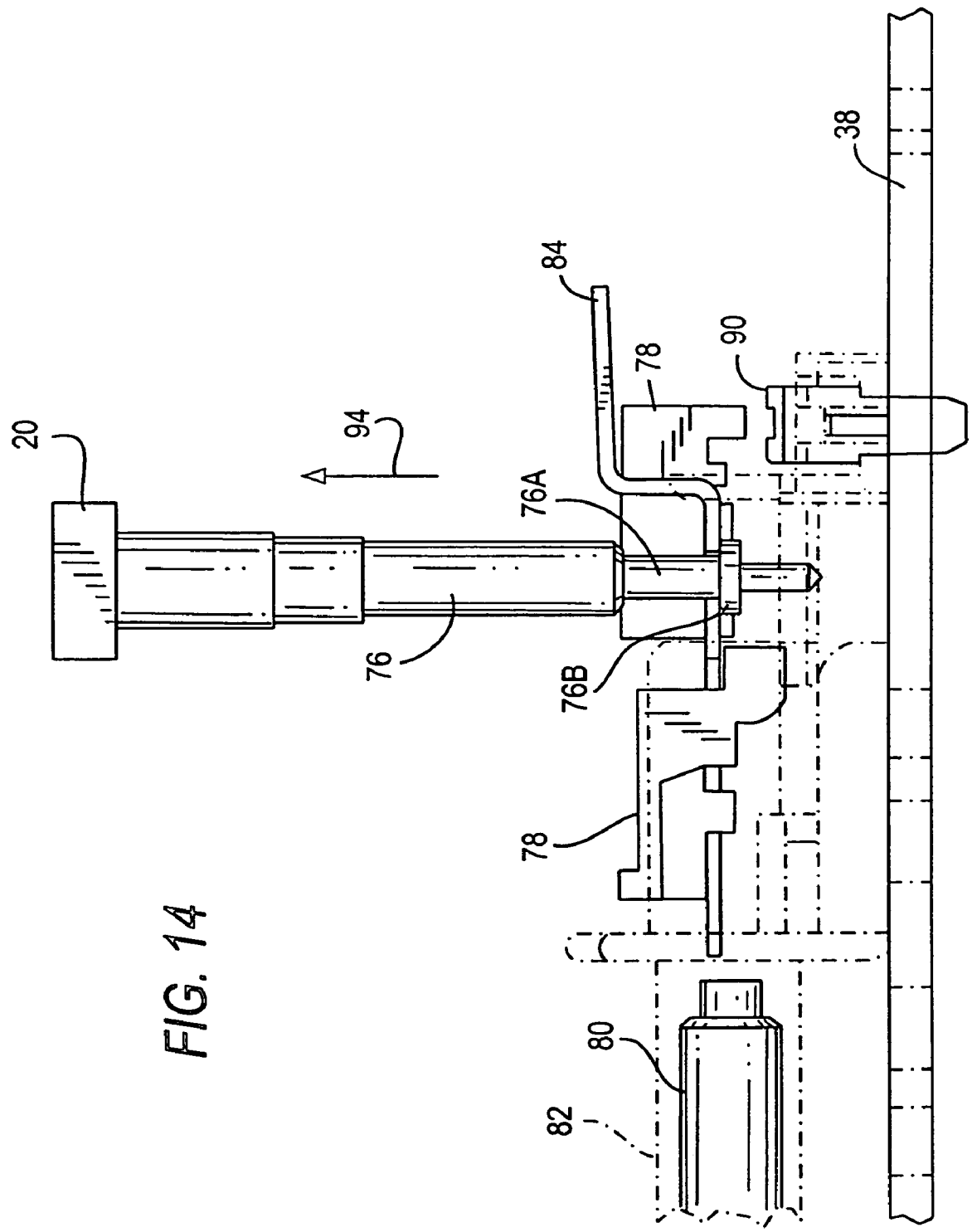

In FIG. 13, the latch plate then recoils back (in the direction shown by arrow 81A) and upon release of the reset button, test arm 90 also springs back disengaging from test pin 92. In FIG. 14, the recoiling of the latch plate 84 causes the opening 84B to once again be misaligned with opening 74A thus trapping flange 76B underneath the lifter 78 and latch assembly. When reset button is released the biasing of the reset pin 76 in concert with the trapped flange 76B raise the lifter and latch assembly causing the lifter (located underneath the movable bridges) to engage the movable bridges 66, 64. In particular, the connecting portions (66A, 64A) of the movable bridges 66 and 64 respectively are bent in the direction shown by arrow 65 (see FIG. 3 and corresponding discussion supra) resulting in the line terminals, load terminals and face terminals being electrically connected to each other. The GFCI is now in the reset mode meaning that the electrical contacts of the line, load and face terminals are all electrically connected to each other allowing power from the line terminal to be provided to the load and face terminals. The GFCI will remain in the reset mode until the sensing circuit detects a fault or the GFCI is tripped purposely by depressing the test button 22.

When the sensing circuit detects a condition such as a ground fault for a GFCI or other conditions (e.g., arc fault, immersion detection fault, appliance leakage fault, equipment leakage fault), the sensing circuit energizes the coil causing the plunger 80 to engage the latch 84 resulting in the latch opening 84B being aligned with the lifter opening 78A allowing the lower portion of the reset pin 76A and the disk 76B to escape from underneath the lifter causing the lifter to disengage from the movable bridges 64, 66 which, due to their biasing, move away from the face terminals contacts and load terminal contacts. As a result, the line, load and face terminals are electrically isolated from each other and thus the GFCI device is in a tripped state or condition (see FIG. 9).

Figure 15:
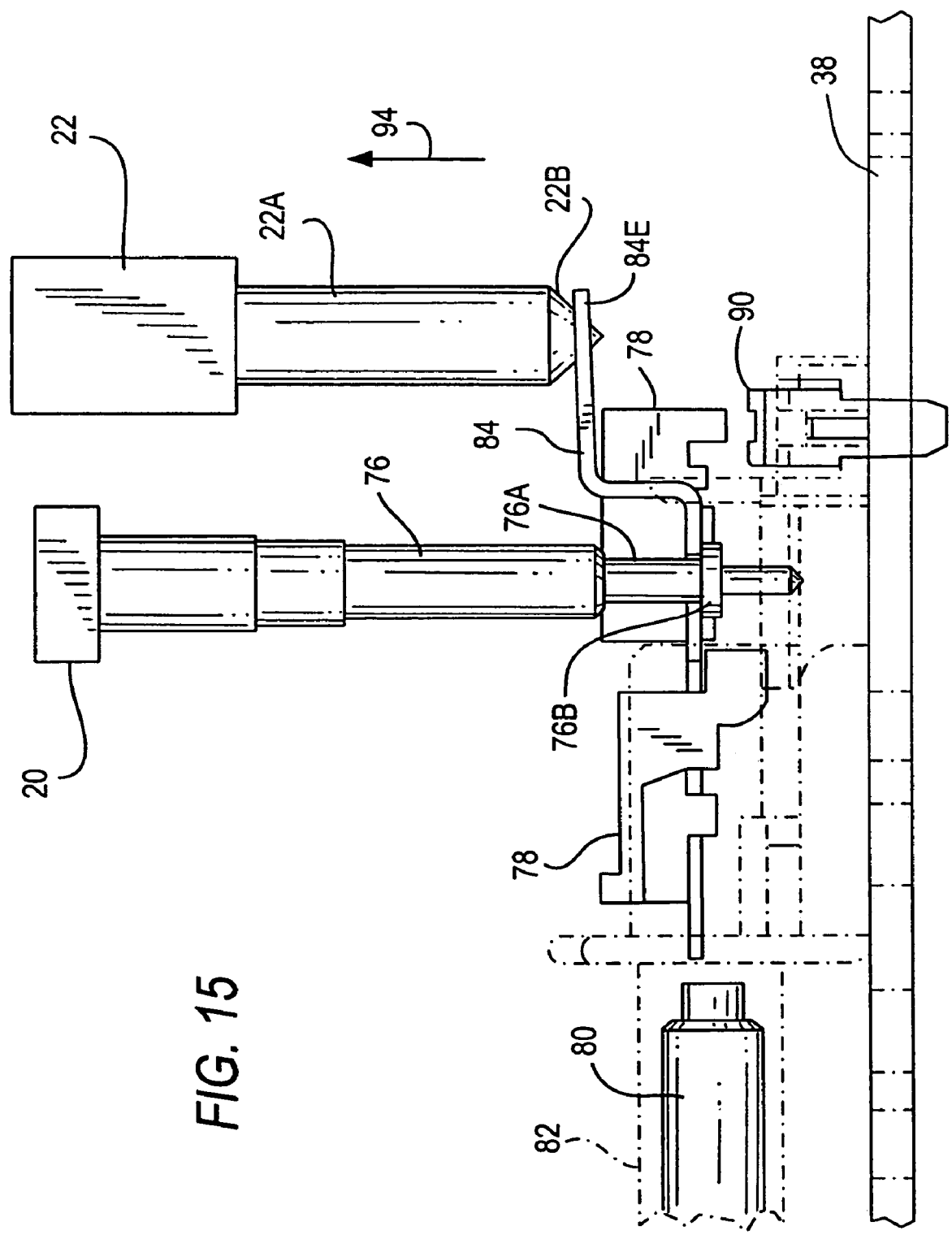
FIGS. 15–18 show the sequence of operation when the device of the present invention is tripped while in a reset state.

The GFCI device of the present invention can also enter the tripped state by pressing the test button 22. In FIGS. 15–18, there is illustrated a sequence of operation showing how the device can be tripped using the test button 22. In FIG. 15, while the device is in the reset mode, test button 22 is depressed. Test button 22 has test button pin portion 22A and cam end portion 22B connected thereto and is mechanically biased upward in the direction shown by arrow 94. The cam end portion 22B is preferably conically shaped so that when it engages with the hooked end 84E of latch plate 84 a cam action occurs due to the angle of the end portion of the test button pin 22A.

Figure 16:
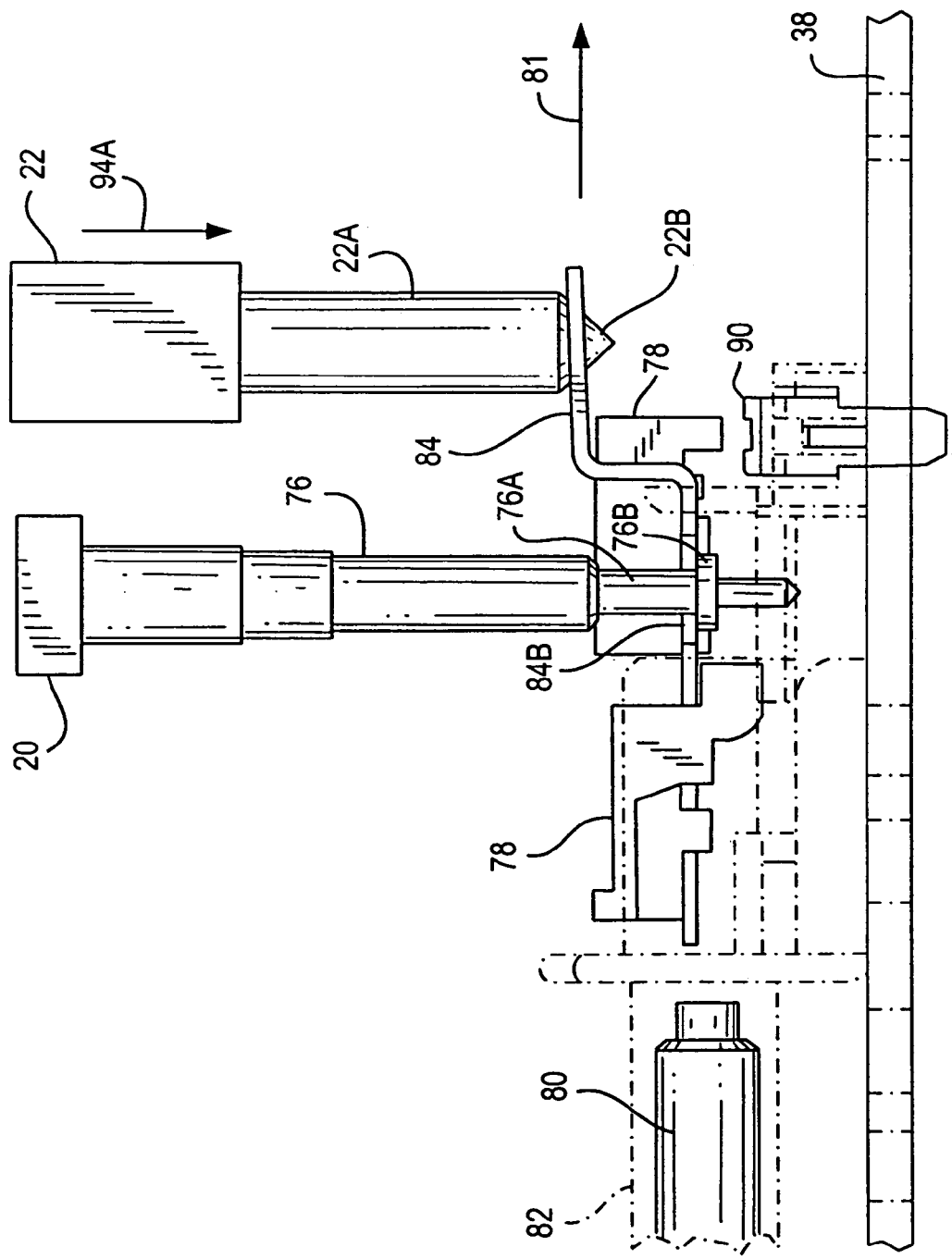

In FIG. 16, the cam action is the movement of latch plate 84 in the direction shown by arrow 81 as test button 22 is pushed down (direction shown by arrow 94A) causing latch plate opening 84B to be aligned with lifter opening 78A.

Figure 17:
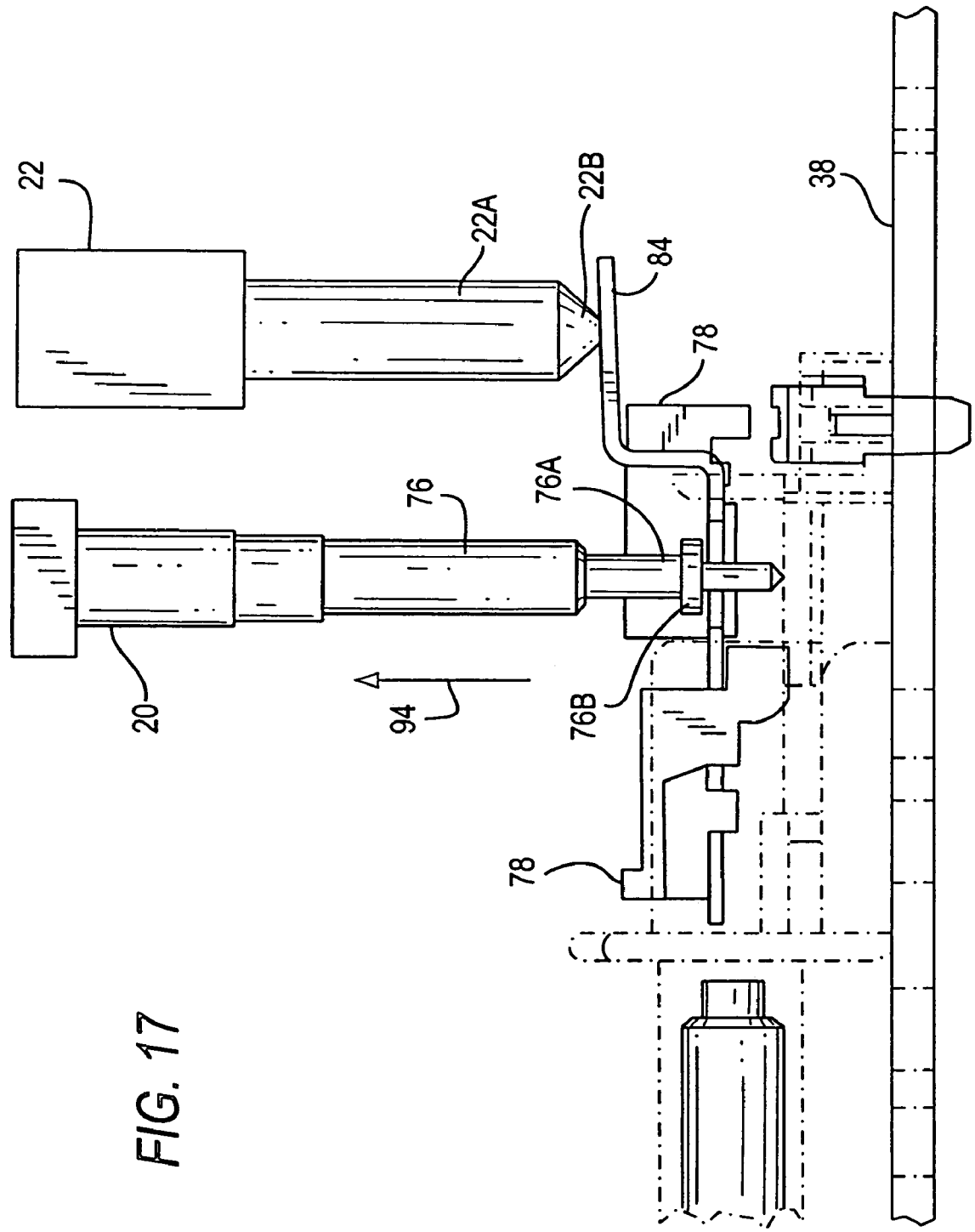
Figure 18:
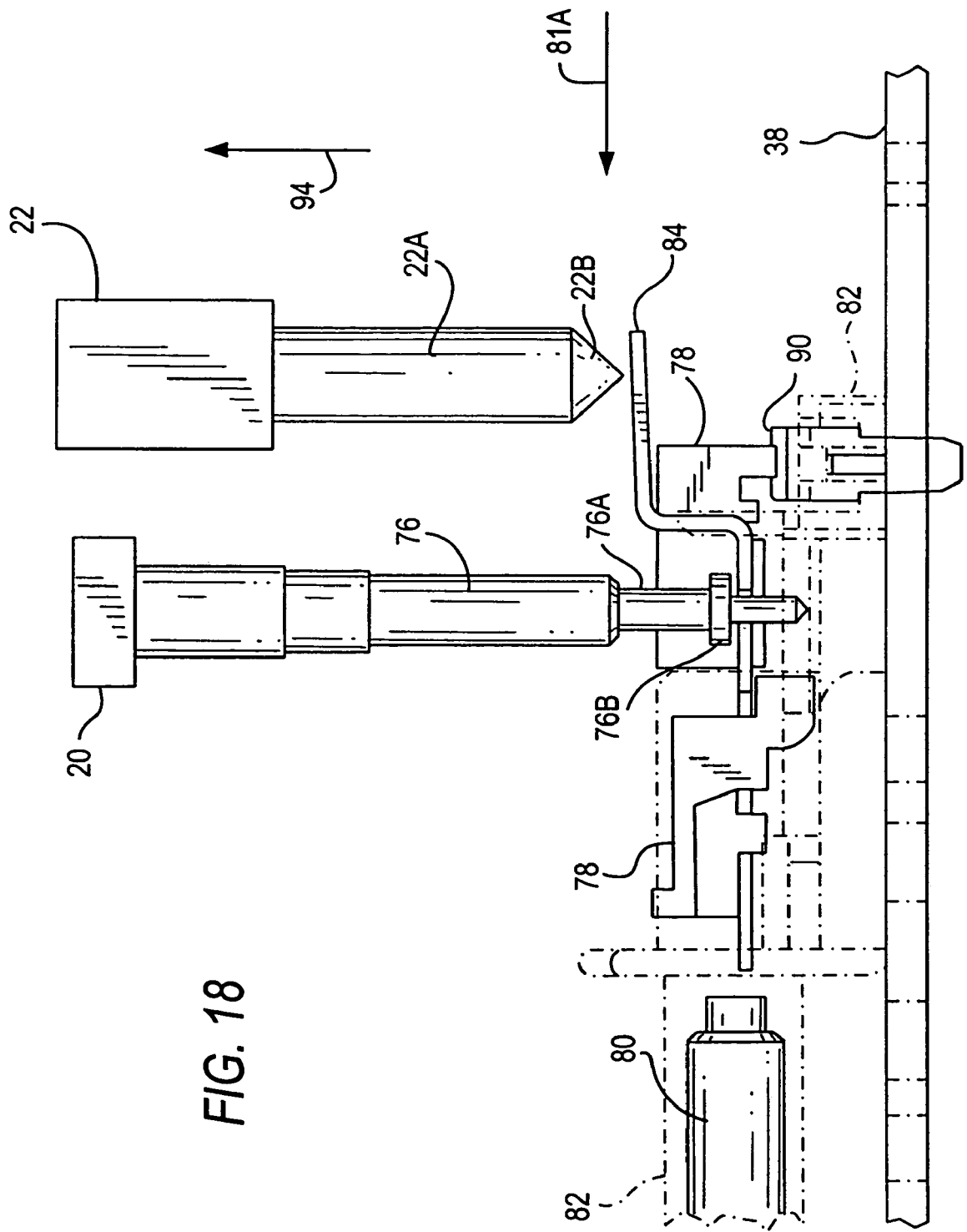

In FIG. 17, the alignment of the openings (78A, 84B) allows the lower portion of the reset pin 76A and the disk 76B to escape from underneath the lifter causing the lifter to disengage from the movable bridges 64, 66 which, due to their biasing, move away from the face terminals contacts and load terminal contacts (see FIG. 3). The test button 20 is now in a fully up position. As a result, the line, load and face terminals are electrically isolated from each other and thus the GFCI device is in a tripped state or condition (see FIG. 9). In FIG. 18, the test button 22 is released allowing its bias to move it upward (direction shown by arrow 94) and disengage from the hook portion 84E of latch plate 84. The latch plate recoils in the direction shown by arrow 81A thus causing the opening in the latch plate 84 to be misaligned with the opening of the lifter 78. The device is now in the tripped position. It should be noted that once the device of the present invention is in a tripped position, depressing the test button will not perform any function because at this point the latch 84 cannot be engaged by the angled end of the test button 22. The test button 22 will perform the trip function after the device has been reset.

The GFCI device of the present invention once in the tripped position will not be allowed to be reset (by pushing the reset button) if the circuit interrupting portion is non-operational; that is if any one or more of the components of the circuit interrupting portion is not operating properly, the device cannot be reset. Further, if the sensing circuit is not operating properly, the device can not be reset. The reset lockout mechanism of the present invention can be implemented in an affirmative manner where one or more components specifically designed for a reset lockout function are arranged so as to prevent the device from being reset if the circuit interrupting portion or if the sensing circuit are not operating properly. The reset lockout mechanism can also be implemented in a passive manner where the device will not enter the reset mode if any one or more of the components of the sensing circuit or if any one or more of the components of the circuit interrupting portion is not operating properly; this passive reset lockout approach is implemented in the present invention. For example, if anyone of the following components is not operating properly or has a malfunction—i.e., the coil/plunger assembly (82,80) or the latch plate/lifter assembly (84,78) or the reset button/reset pin (22,76) the device cannot be reset. Further if the test arm (90) or test pin (92) is not operating properly, the device cannot be reset.

It should be noted that the circuit interrupting device of the present invention has a trip portion that operates independently of the circuit interrupting portion so that in the event the circuit interrupting portion becomes non-operational the device can still be tripped. Preferably, the trip portion is manually activated as discussed above (by pushing test button 22) and uses mechanical components to break one or more conductive paths. However, the trip portion may use electrical circuitry and/or electromechanical components to break either the phase or neutral conductive path or both paths.

Although the components used during circuit interrupting and device reset operations are electromechanical in nature, the present application also contemplates using electrical components, such as solid state switches and supporting circuitry, as well as other types of components capable or making and breaking electrical continuity in the conductive path.

It should also be noted that the circuit interrupting device of the present invention can be part of a system comprising one or more circuits routed through a house, for example, or through any other well known structure. Thus, the system of the present invention is configured with electricity conducting media (e.g., electrical wire for carrying electrical current) that form at least one circuit comprising at least one circuit interrupting device of the present invention, electrical devices, electrical systems and/or components; that is, electrical components, electrical devices and or systems can be interconnected with electrical wiring forming a circuit which also includes the circuit interrupting device of the present invention. The formed circuit is the system of the present invention to which electrical power is provided. The system of the present invention can thus protect its components, systems, or electrical devices by disconnecting them from power if the circuit interrupting device has detected a fault (or predetermined condition) from any one of them. In one embodiment, the circuit interrupting device used in the system can be a GFCI.

While there have been shown and described and pointed out the fundamental features of the invention, it will be understood that various omissions and substitutions and changes of the form and details of the device described and illustrated and in its operation may be made by those skilled in the art, without departing from the spirit of the invention.

What is claimed:

1. A circuit interrupting device comprising:
    a housing;
    a pair of line terminals disposed at least partially within said housing and capable of being electrically connected to a source of electricity;
    a pair of load terminals disposed at least partially within said housing and capable of conducting electrical current to a load when electrically connected to said line terminals;
    at least one pair of face terminals capable of being electrically connected to user accessible plugs and/or receptacles where the pair of line terminals, the pair of load terminals and the pair of face terminals are electrically isolated from each other;
    a pair of electrical conductors for electrically connecting the line terminals to the load terminals and for connecting the line terminals to the face terminals;
    a circuit interrupting portion disposed within said housing, said circuit interrupting portion comprising a coil and movable plunger assembly, and a latch and lifter assembly where said latch has an opening and where a portion of the latch having the opening is springingly and slidably mounted underneath said lifter which also has an opening, the latch and lifter assembly positioned to engage the pair of electrical conductors, such that upon the occurrence of a predetermined condition the coil is energized activating the plunger which engages one end of the latch causing the lifter to disengage from the pair of electrical conductors disconnecting the line terminals from the load terminals and disconnecting the line terminals from the face terminals;
    a reset portion comprising a reset button and a biased mechanical switch assembly, the reset button is attached to a reset pin where said reset button and reset pin are mechanically biased, said reset pin having a circular flange extending from its end portion, said flange positioned to interfere with the latch when the opening of the latch is not aligned with the opening of the lifter, the lifter positioned to activate the baised mechanical switch causing the coil to energize activating the movable plunger to engage the one end of the latch causing the latch opening to align with the lifter opening allowing the flange portion of the reset pin to extend through the aligned openings to engage the latch lifter assembly which engages the electrical conductors causing the line terminals to electrically connect to the load terminals and face terminals thus resetting the device.

2. The circuit interrupting device of claim 1 where the predetermined condition comprises a ground fault, an arc fault, an appliance leakage fault, equipment leakage fault or an immersion detection fault.

3. The circuit interrupting device of claim 1 further comprising a trip portion configured to cause electrical discontinuity between the line load and face terminals where said trip portion comprises a trip button having an angled end for engaging another end of the latch causing the opening of the latch to align with the opening of the lifter allowing the reset pin to disengage the lifter causing the line, load and face terminals to be disconnected from each other.

4. The circuit interrupting device of claim 1 where each face terminal extends from and is integral with a metallic structure disposed within said housing.

5. The circuit interrupting device of claim 1 further comprising a sensing circuit for detecting the occurrence of the predetermined condition.

* * * * *